US005759419A

United States Patent [19]

Mochida et al.

[11] Patent Number: 5,759,419
[45] Date of Patent: Jun. 2, 1998

[54] METHOD OF MANUFACTURING A MAGNETIC RECORDING MEDIUM AND A SEMICONDUCTOR LASER TEXTURING APPARATUS

[75] Inventors: Mitsunori Mochida, Yokohama; Hideaki Kaneda; Itaru Sakamoto, both of Ushiku, all of Japan

[73] Assignee: Mitsubishi Chemical Corporation, Tokyo, Japan

[21] Appl. No.: 725,457

[22] Filed: Oct. 4, 1996

[30] Foreign Application Priority Data

| Oct. 5, 1995 | [JP] | Japan | 7-284593 |
| Dec. 19, 1995 | [JP] | Japan | 7-330203 |
| Dec. 19, 1995 | [JP] | Japan | 7-330204 |
| Dec. 19, 1995 | [JP] | Japan | 7-330205 |

[51] Int. Cl.$^6$ .............. B44C 1/22; G11B 7/00; B05D 5/12
[52] U.S. Cl. .............. 216/22; 369/121; 427/127
[58] Field of Search ............. 369/121; 427/127; 216/22

[56] References Cited

FOREIGN PATENT DOCUMENTS

| 0 447 025 | 9/1991 | European Pat. Off. |
| 93/21629 | 10/1993 | WIPO |

OTHER PUBLICATIONS

Patent Abstracts of Japan, P–field, vol. 17, No. 505, JP 5–128509 A, Sep. 10, 1993.
Search report for Singapore Patent Application 9610791-7 (Austrian Patent Office, Apr. 28, 1997).

*Primary Examiner*—Susan A. Loring
*Attorney, Agent, or Firm*—David G. Conlin; Eric P. Raciti

[57] ABSTRACT

A method of manufacturing a magnetic recording medium having at least a magnetic layer, optionally by means of an underlayer, on a non-magnetic substrate, and occasionally having a protective layer disposed on the magnetic layer, comprises irradiating to the surface of the non-magnetic substrate, the underlayer, the magnetic layer, the protective layer or the magnetic recording medium, a laser beam from a semiconductor laser module that moves relatively to the non-magnetic substrate, thereby applying a texturing; and a semiconductor laser texturing apparatus comprises a substrate rotating mechanism, a semiconductor laser module including a semiconductor laser beam source, a collimator for converting a semiconductor laser beam into a parallel beam and a light focusing mechanism for irradiating the laser beam to a projection-forming surface of a substrate supported rotatably by the substrate rotating mechanism, and a relative moving mechanism for the substrate supported rotatably by the substrate rotating mechanism and the semiconductor laser module.

21 Claims, 16 Drawing Sheets

METHOD OF MANUFACTURING A MAGNETIC RECORDING MEDIUM AND A SEMICONDUCTOR LASER TEXTURING APPARATUS

BACKGROUND OF THE INVENTION

The present invention relates to a method of manufacturing a magnetic recording medium and a semiconductor laser texturing apparatus, and more specifically, it relates to a method of manufacturing a magnetic recording medium comprising an improved texturing and a semiconductor laser texturing apparatus suitable to texturing in the method of manufacturing a magnetic recording medium.

Usually, a mechanical texture is applied to a magnetic recording medium (hard disk) with a purpose of reducing coefficient of friction upon CSS (contact start and stop operation). By the way, for the improvement of the magnetic recording density, the reduction for the head flying height is demanded and a smoothness is required in a magnetic recording region of a disk. In order to satisfy the requirement, there is a zone texturing for only the CSS zone and a method, for example, of forming projections and depressions which are present adjacent to each of the projections by the irradiation of a high power laser is known.

By the way, when the zone texturing is applied by laser irradiation, a laser beam at a required energy has to be irradiated at a high accuracy being restricted in a narrow range onto a hard disk substrate. For this purpose, a high power laser and a condensing objective lens are necessary. However, a high power laser as typically represented by an Nd-YAG Q switch laser is expensive and involves a problem of increasing the cost for the entire fabrication apparatus. In addition, it is not sufficient in view of the control-liability for the pulse conditions. Further, the size of the laser beam source and the apparatus is also large.

As a result of the present inventors' earnest studies, it has been found that by irradiating to the surface of a non-magnetic substrate, an underlayer, a magnetic layer, a protective layer or a magnetic recording medium, a laser beam from a semiconductor laser module which moves relatively to the non-magnetic substrate, thereby applying a texturing, not only the cost for entire apparatus is reduced but also the semiconductor laser texturing apparatus itself is small in size, and the repeating frequency and the duty in the texturing can be controlled for a wide range. The present invention has been attained on the basis of the finding.

SUMMARY OF THE INVENTION

The object of the present invention is to provide a method of manufacturing a magnetic recording medium at a small scale and a reduced cost, and capable of laser texturing, and a semiconductor laser texturing apparatus suitable to the texturing for the method of manufacturing the magnetic recording medium.

To accomplish the aim, in a first aspect of the present invention, there is provided a method of manufacturing a magnetic recording medium comprising at least a magnetic layer, optionally by means of an underlayer, disposed on a magnetic substrate, and if necessary, a protective layer disposed on the magnetic layer, which method comprises irradiating, to the surface of a non-magnetic substrate, an underlayer, a magnetic layer, a protective layer or a magnetic recording medium, a laser beam from a semiconductor laser module that moves relatively to the non-magnetic substrate, thereby applying a texturing.

In a second aspect of the present invention, there is provided a semiconductor laser texturing apparatus comprising a substrate rotating mechanism, a semiconductor laser module including a semiconductor laser light source, a collimator for converting a semiconductor laser light into a parallel beam and a light focusing mechanism for irradiating the laser beam to a projection-forming surface of a substrate supported rotationally by the substrate rotating mechanism, and a relative moving mechanism for the substrate supported rotatably by the substrate rotating mechanism and the semiconductor laser module.

DETAILED DESCRIPTION OF THE INVENTION

Figure 1:
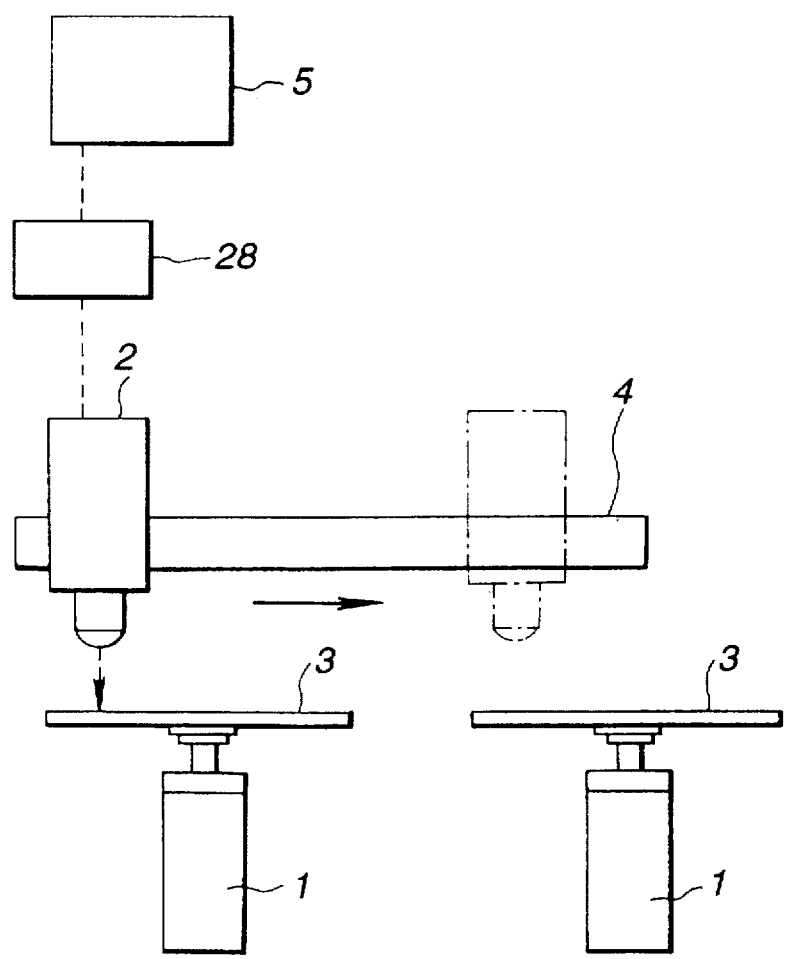
FIG. 1 is an entire explanatory view for one embodiment of a semiconductor laser texturing apparatus according to the present invention.

The present invention will be explained more in details.

A method of manufacturing a magnetic recording medium of the present invention will at first be explained. In the present invention, a magnetic recording medium has at least a magnetic layer, optionally by means of an underlayer, on a non-magnetic substrate, and if necessary, a protective layer on the magnetic layer. In the subsequent description, the non-magnetic substrate is sometimes referred to simply as "substrate".

In the present invention, an aluminum alloy substrate, a glass substrate or a silicon substrate can be used suitably as the substrate, but a substrate made of other metal such as copper and titanium, a carbon substrate, a ceramic substrate or a resin substrate may also be used. For the silicon substrate, a pure silicon substrate as well as a silicon alloy substrate containing a trace amount of elements for enhancing the strength can be used. The substrate is usually formed as a disk-shape but a substrate of other shape, for example, a card-type substrate may also be used.

In the present invention, the magnetic recording medium can be constituted by forming the magnetic layer directly on the surface of the substrate, but the magnetic medium may be constituted by forming an underlayer on the surface of the substrate and then forming a magnetic layer on the underlayer. As the underlayer, a non-magnetic underlayer composed of an Ni-P alloy is suitable and such an underlayer is formed usually by an electroless plating method or sputtering method. The thickness of the underlayer is usually from 50 to 20,000 nm, preferably from 100 to 15,000 nm.

It is preferred that an intermediate layer such as a Cr layer or a Cu layer is disposed between the substrate or the underlayer and the magnetic layer. The thickness of the intermediate layer is usually from 20 to 200 nm, preferably from 50 to 100 nm. The magnetic layer (magnetic recording layer) comprises a thin ferromagnetic alloy film composed of Co-P alloys, Co-Ni-P alloys, Co-Ni-Cr alloys, Co-Ni-Pt alloys, Co-Cr-Ta alloys, Co-Cr-Pt alloys or Co-Cr-Ta-Pt alloys and is formed by a method, for example, of electroless plating, electric plating, sputtering or vapor deposition (vacuum evaporation). The thickness of the magnetic recording layer is usually about from 30 to 70 nm.

Usually, a protective layer is formed on the surface of the magnetic recording layer. The protective layer comprises a carbon film, a hydrogenated carbon film, a carbide film composed of TiC or SiC, a nitride film composed of SiN or TiN, or an oxide film composed of SiO, $Al_2O_3$ or ZrO, and is formed by a method, for example, of vapor deposition, sputtering, plasma CVD, ion plating or wetting process. As the protective layer, the carbon film or the hydrogenated carbon film is more preferred.

Further, a lubricant layer is usually formed on the surface of the protective layer. As the lubricant, for example, a liquid fluorocarbon-based lubricant is used suitably and the lubricant layer is usually formed on the surface of the protective layer, for example, by a dipping method. However, in a case of using a magnetic head having a diamond-like carbon layer on a slider surface, it is not always necessary for providing the protective layer or the lubricant layer since tribologic property between the magnetic head and the magnetic recording medium is improved.

In the method of manufacturing the magnetic recording medium in the present invention, the texturing is applied by irradiation of a laser beam (laser light) on the surface of the non-magnetic substrate, the underlayer, the magnetic layer, the protective layer or the magnetic recording medium. The surface on which projections are formed by the texturing means a side in contact with the magnetic head.

In the present invention, the texturing is preferably applied to the underlayer (Ni-P layer) on the substrate, but projections can be formed also by applying the texturing to the surface of any optional layer from the substrate to the protective layer under substantially the same condition. The texturing can of course be applied to the surface of the magnetic recording medium as the final stage. Further, as the laser beam, either a continuous laser beam or a pulse laser beam may be used, and the pulse laser beam is used usually.

Usually the substrate is used after applying a mirror finishing (polishing) treatment. In case of using a substrate applied with the underlayer (for example, a Ni-P underlayer), the mirror finishing treatment is applied to the surface of the underlayer. In case of using such substrate, a slight mechanical texture is applied to the entire surface of the substrate to form low projections. Such mechanical texture can provide the following advantageous effects.

That is, also in the case where the height or the density of projections formed by the laser beam is low or small, that is, in a state in which the magnetic recording medium and the magnetic head are partially in contact with each other, the stitching is less caused and coefficient of friction is reduced as compared with a case of using a simply mirror-finished substrate. Further, since projection-forming conditions to be described later can be selected from a wide range, it is particularly suitable to mass production.

The feature of the method of manufacturing of the present invention lies in the use of a semiconductor laser module. That is, in the present invention, a laser beam is irradiated from a semiconductor laser module that moves relatively to a non-magnetic substrate, to apply the texturing to the surface, for example, of an underlayer (projection-forming surface) on the substrate.

The texturing apparatus using the semiconductor laser module is to be described later in details as the semiconductor laser texturing apparatus of the present invention. The semiconductor laser (laser diode: LD) has merits that the cost is reduced as compared with a high power laser typically represented by Nd-YAG Q switch laser and that the apparatus is relatively small in the size.

In the present invention, a semiconductor laser module is designed such that the power at the irradiation surface is not less than 70 mW, and a spot diameter has a major axis of not more than 6 μm and a minor axis of not more than 3 μm, and the laser beam from such a semiconductor laser module is irradiated on the projection-forming surface. The power is preferably not less than 200 mW, more preferably from 250 to 500 mW. Usually, the size of the spot diameter is approximately calculated by the following formula based on a numerical aperture (N.A.) of a lens used and the size of a near field pattern (NFP) of a semiconductor laser beam source used. The spot diameter in the present invention means the diameter of an ellipse or true circle in which the intensity is lowered to "$1/e^2$" for the maximum intensity at a central beam portion.

(Spot Diameter)=(NFP)×(N.A. of Collimator Lens)/(N.A. of Objective Lens).

In the present invention, irradiation is applied preferably by using a pulse laser beam from the semiconductor laser module under the condition at a repeating frequency from 10 kHz to 4 MHz and at a duty from 1 to 50%. The preferred repeating frequency is from 20 kHz to 300 kHz and the preferred duty is from 2 to 20%. In the present invention, use of the semiconductor laser as the laser beam source is extremely advantageous from an industrial point of view in that the condition for the texturing can be controlled finely since the repeating frequency and the duty can be controlled for a wide range.

Figure 9A:
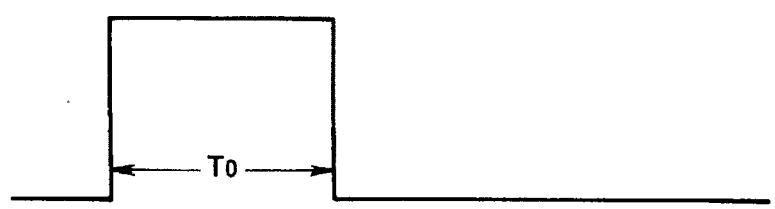
FIG. 9 (a) is an explanatory view of a light emission setting time in a driving electric circuit, and FIG. 9 (b) is an explanatory view for raising time of a pulse laser light and falling time of a pulse laser light.
Figure 9B:
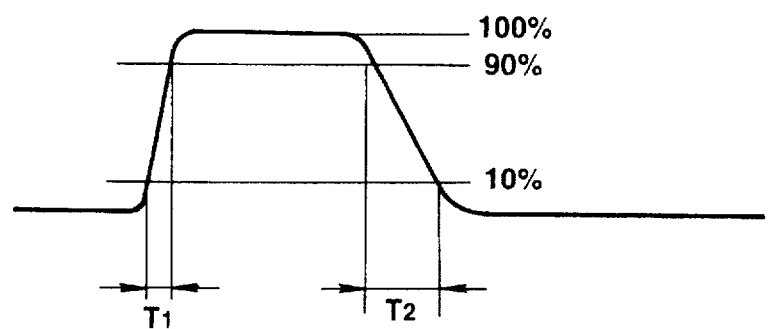

In the case of using the pulse laser beam from the semiconductor laser module, the shorter rising time and falling time are preferred, since projections of a relative uniformly shape can be formed. Specifically, the rising time ($T_1$) and the falling time ($T_2$) shown in FIG. 9(b) are preferably not more than 40% relative to a light emission time determined by a pulse application current shown in FIG. 9(a) (light emission setting time in a driving electric circuit). As shown in FIG. 9(b), $T_1$ and $T_2$ mean, respectively, a period of time rising from 10% to 90% and a period of time falling from 90% to 10% in an amplitude of a pulse current observed by utilizing an oscilloscope. The pulse current shown in FIG. 9(b) corresponds to LD pulse light emission.

By the way, the light emission setting time is, for example, 533 ns at the repeating frequency of 150 kHz and at the duty of 8%, in which the rising time of about 20 ns (3.8% to the emission setting time), and a falling time of about 25 ns (4.7% to the emission setting time) are observed in this case. As a means for shortening the rising time and the falling time of the pulse laser beam, there can be mentioned means for matching impedance for each of the semiconductor laser beam source and a driving electric circuit therefor. Further, a protective resistor may be connected in series with the semiconductor laser, if necessary.

Laser texturing is applied by rotationally supporting a substrate, moving the substrate and a semiconductor laser module relatively to each other, and scanning a laser beam on a projection-forming surface of the substrate. A portion irradiated with the laser beam and a periphery thereof are deformed to form projections (depressions and projections). Zone texturing can be applied by irradiating a laser beam to a CSS zone of a magnetic recording medium.

The rotational speed of the substrate is usually from 100 to 10,000 rpm, preferably from 100 to 7,200 rpm, more preferably from 120 to 900 rpm. Further, a pattern of forming projections can be selected optionally and, an example of a pattern has a track pitch of about 5 μm and a projection pitch of about 10 μm in one track.

In a case where a laser beam has an elliptic spot shape, the method of scanning the laser beam to the projection-forming surface on the substrate includes: (A) a method of scanning in a direction parallel with the major axis of an ellipse, (B) a method of scanning in a direction parallel with the minor axis of the ellipse, and (C) a method of scanning in a direction different from the major axis or the minor axis of the ellipse.

According to the method (A), a projection with a sharp top is formed, whereas a projection having a width increased in the direction of the major axis and a smooth top in the method (B). That is assumed to be attributable to that the irradiation width in the direction orthogonal to the scanning direction is increased in the method (B) than in the method (A), under the identical conditions for the elliptic spot, scanning time and the scanning speed.

The means capable of changing the shape of the projection, particularly, the shape in the vicinity of the top of the projection by changing the scanning direction, can be utilized for controlling the coefficient of friction in the CSS zone. Such a means is effective in a case of using an elliptic spot having an aspect ratio (major diameter/minor diameter ratio) of not less than 1.5, specifically from 1.5 to 10.

A semiconductor laser texturing apparatus according to the present invention will be explained with reference to FIG. 1 to FIG. 8.

The semiconductor laser texturing apparatus according to the present invention basically comprises, as shown in FIG. 1, a substrate rotating mechanism 1, a semiconductor laser module 2 and a relative moving mechanism 4 for a substrate 3 rotationally supported by the substrate rotating mechanism 1 and the semiconductor laser module 2. Details of the semiconductor laser module 2 will be explained in FIG. 2 to FIG. 8.

In the apparatus illustrated in FIG. 1, while two substrate rotating mechanisms 1 are exemplified, the number of the mechanisms is optional. Further, while the relative moving mechanism 4 comprises a horizontal moving mechanism for the semiconductor laser module 2, it may be constituted with a horizontal moving mechanism (not illustrated) for the substrate rotating mechanism 1. Further, the semiconductor laser module 2 may be provided with a vertical moving mechanism for adjusting focus.

The substrate rotating mechanism 1 usually comprises a spindle motor, and the substrate 3 is supported on a rotational shaft of the spindle motor and moved at a predetermined number of rotation or at a linear speed. As the moving mechanism 4, a linear slider, for example, is used suitably. The semiconductor laser module 2 is mounted on the moving mechanism 4 and reciprocated in a horizontal direction to a plurality of substrate rotating mechanisms 1, 1 . . . at a predetermined speed.

Usually, the moving mechanism 4 is moved at an increased speed when it is moved from one substrate 3 to other substrate 3 considering the productivity. Such speed control can be conducted by moving other moving mechanism on the moving mechanism 4 and conducting movement between the substrates by one of the mechanisms, while conducting movement for forming projections by the other.

The apparatus described above has a timing control section 5 for controlling the modulation timing of the laser beam as a means for forming projections of a predetermined pattern with identical or different pitch. That is, when projections are formed at an identical pitch adapted usually, for example, when the substrate 3 is moved at a predetermined number of rotation or a predetermined speed by the predetermined speed operation of the substrate rotating mechanism 1 and the moving mechanism 4, the pitch between the projections in one track formed on the surface of the substrate is increased toward the outer circumference. Then, the position of the substrate is confirmed by the timing control section 5 and the modulation timing of the laser beam (irradiation time) is controlled by a signal of confirmation, thereby making the pitch constant between the projections formed on the surface of the substrate.

The timing control section 5 comprises, for example, a computer, a position detection mechanism and interfaces. As a position detection mechanism, a laser displacement gage, an encoder or the like can be utilized.

Instead of controlling the modulation timing of the laser beam, the speed of the substrate rotating mechanism 1 and the moving mechanism 4 may be controlled.

In the present invention, the semiconductor laser module 2 includes four modes as shown in FIGS. 2 to 8.

Figure 2:
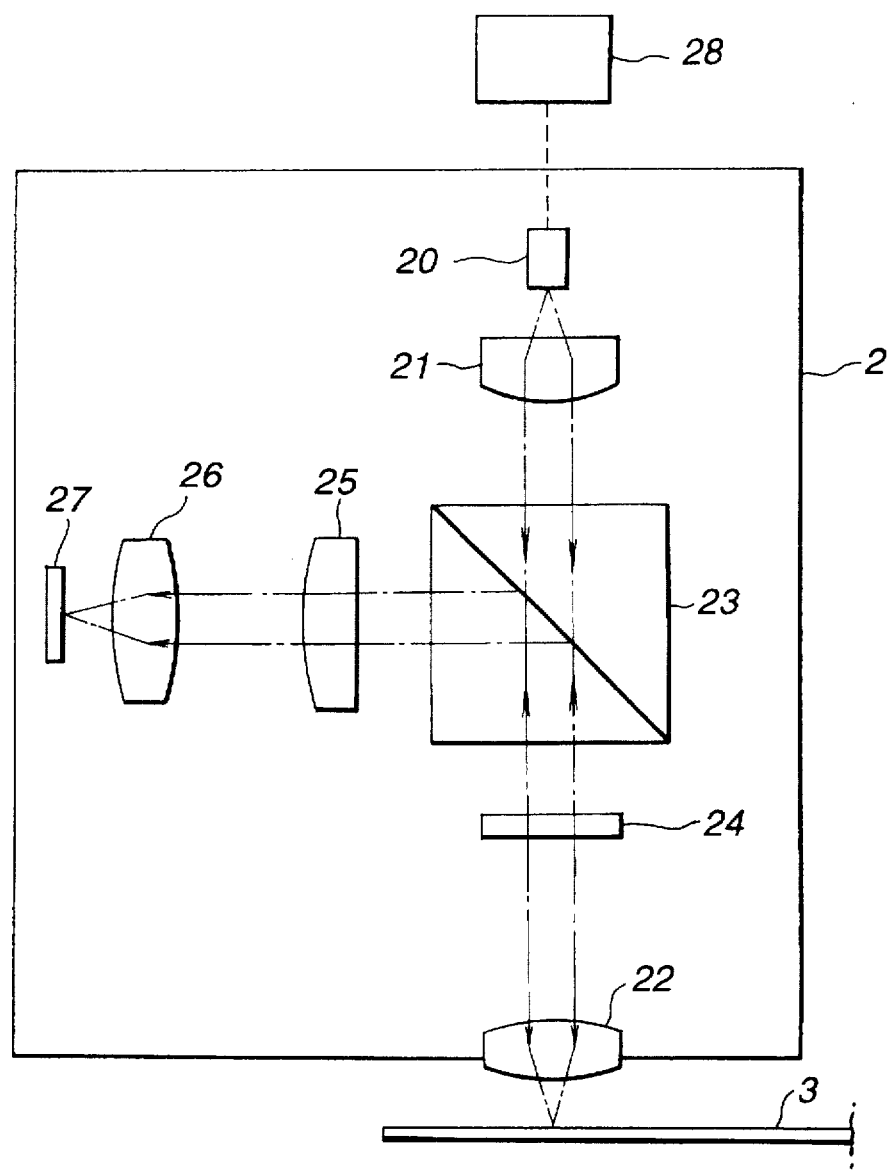
FIG. 2 is a detailed explanatory view of a semiconductor laser module used in the semiconductor laser texturing apparatus according to the present invention.

A semiconductor laser module 2 illustrated in FIG. 2 is at first explained.

The semiconductor laser module 2 comprises a semiconductor laser beam source 20, a collimator 21 for converting a semiconductor laser beam into a parallel beam and a focusing mechanism 22 for irradiating a laser beam on a projection-forming surface on the substrate 3 rotationally supported by the substrate rotating mechanism 1 shown in FIG. 1.

The semiconductor laser light source (Chip or Can) 20 is preferably designed optically such that the power is not less than 80 mW, and has an elliptic or true circular NFP with a major axis of not more than 8 μm and a minor axis of not more than 4 μm. Such conditions can be usually attained by using a semiconductor device such as an AlGaAs laser, InGaAsP laser or AlGaInP laser (laser diode). Among them, the AlGaAs or InGaAs laser is suitable in view of high power.

The collimator 21 usually comprises a collimator lens as shown in FIG. 2, but it may comprise a combination of two cylindrical lenses. In this case, both of the cylindrical lenses are arranged in such a positional relationship that axial directions thereof (directions corresponding to the rotational central axes of circular cylinders) are in perpendicular to each other. The N.A. of the collimator 21 ranges usually from 0.1 to 0.5, preferably from 0.3 to 0.5. The collimator lens or other lens is preferably applied with an anti-reflection coating (AR coating) aligned with the wavelength of the laser beam used in order to effectively take out the power of the laser beam.

As the focusing mechanism 22, a condensing objective lens having the N.A. of from 0.5 to 0.8 is suitable. When the semiconductor laser light source 20 and the collimator 21 are disposed to other positions than those above the substrate rotating mechanism 1 shown in FIG. 1, the optical path can be changed by the combination of a total reflection mirror with the condensing objective lens.

Since the power of the semiconductor laser is lower compared with a high power laser typically represented by an Nd-YAG Q switch laser, the focusing mechanism (condensing objective lens) 22 has a function of strengthening the power per area by restricting the laser beam upon irradiation. The focusing mechanism 22 is usually used in combination with an automatic focusing (AF) system and various kind of systems including an astigmatic method can be used for the AF system.

In the present invention, the semiconductor laser module is preferably provided with a means for preventing the effects of a back reflected light returning from the surface to be textured (surface of the non-magnetic substrate, underlayer, magnetic layer or magnetic recording medium) to the semiconductor laser light source.

The semiconductor laser module 2 illustrated in FIG. 2 comprises a constitution in which a polarization beam splitter (PBS) 23 and a ¼ (quarter) wavelength plate (QWP) 24 are disposed successively ahead of the collimator 21. Then, the back reflected light taken out by the PBS 23 is delivered to a focus error detector (FED) comprising a cylindrical lens 25, an objective lens 26 and a 4-segmented photodiode 27 for AF. The shape of the PBS 23 may be cubic as shown in FIG. 2, or any other shape, for example, a plate shape.

The semiconductor laser light source 20 usually emits a pulse beam by ON/OFF control of a driving electric circuit 28. The modulation timing (irradiation time) is properly controlled by the timing control section 5 shown in FIG. 1. As described above, it is preferred to take impedance matching between the semiconductor laser light source 20 and the driving electric circuit 28, to connect a protective resistor in series with the semiconductor laser light source 20, if necessary, and to shorten the rising time and the falling time of the pulse laser beam.

It is preferred that the semiconductor laser texturing apparatus according to the present invention has a means for changing the scanning direction of the elliptic laser beam (not illustrated). The scanning direction of the elliptic laser beam can be changed by changing the relative positional relation between the scanning direction determined by the rotational direction of the substrate 3 and the major axis or the minor axis of the elliptic laser beam irradiated from the focusing mechanism 22. As a concrete means, there can be mentioned, for example, a method of rotating the direction of the semiconductor laser module 2 around the axis of the elliptic laser beam as a center changing the attaching position thereof, if necessary, or a method of changing the position of the substrate rotating mechanism 1, that is, the substrate 3. In this case, known accurate positioning mechanism or the like can be utilized.

The laser beam irradiated from the semiconductor laser module 2 to the surface to be textured is controlled to an energy (power) capable of forming an aimed projection. The actual power is different depending, for example, on the material of the substrate surface and the time of irradiation to the substrate surface. Generally, the semiconductor laser module 2 is designed optically such that the power at the surface to be textured is not less than 70 mW, preferably not less than 200 mW, more preferably, 250 to 500 mW. Further, the semiconductor laser module 2 is preferably designed optically such that a major axis of the spot diameter is not more than 6 μm and a minor axis of the spot diameter is not more than 3 μm. The major axis of the spot diameter is preferably within a range from 1 to 4 μm and the minor axis of the spot diameter is preferably within a range from 1 to 2 μm.

Figure 3:
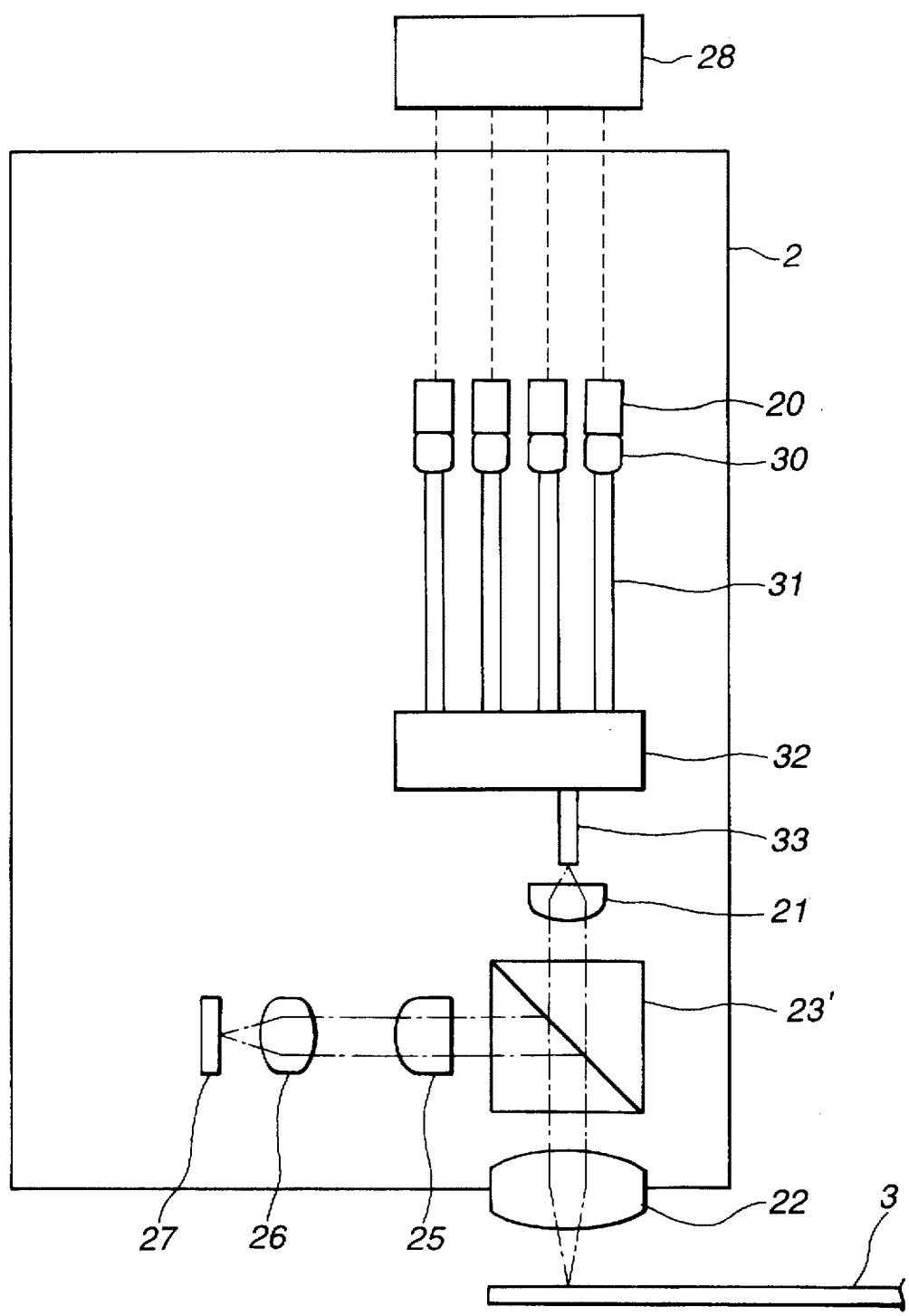
FIGS. 3 to 8 are detailed explanatory views of another semiconductor laser module used in the semiconductor laser texturing apparatus according to the present invention.

Then, the semiconductor laser module 2 illustrated in FIG. 3 is to be explained. The semiconductor laser module 2 comprises a plurality of semiconductor laser light sources 20, a coupling mechanism 32 for bundling laser beams emitted from each of the light sources by way of each of optical fibers 31 into one optical fiber 33, a collimator 21 for converging the laser beam collected into one bundling optical fiber 33 into a parallel beam, and a focusing mechanism 22 for irradiating a laser beam on a projection-forming surface of the substrate 3 rotationally supported by a substrate rotating mechanism 1.

In the semiconductor laser module 2 illustrated in FIG. 3, four semiconductor laser light sources 20 are provided. Each of the semiconductor laser light sources 20 is led usually by way of each of optical systems 30 usually comprising a lens or the like to each of optical fibers 31. A single mode optical fiber is preferably used for each of the optical fibers 31.

The semiconductor laser module 2 illustrated in FIG. 3 comprises a constitution in which a non-polarization beam splitter (NPBS) 23' is disposed ahead of the collimator 21. Different from the semiconductor laser module 2 shown in FIG. 2, the non-polarization beam splitter (NPBS) 23' is used, because the laser beam emitted from the bundling optical fiber 33 is a non-polarization light. Then, the back reflected light taken out by the NPBS 23' is delivered to a focus error detector (FED) comprising a cylindrical lens 25, an objective lens 26 and a 4-segmented photodiode 27 for AF. The shape of the non-polarization beam splitter (NPBS) 23' may be cubic as shown in FIG. 3, or any other shape, for example, a plate shape.

The higher transmittance is preferred for the non-polarization beam splitter 23' in order for taking out greater power to be irradiated to the projection-forming surface on the substrate 3, but it requires reflectance of about several percent for taking out other back reflected light for autofocusing. On the other hand, it is preferred that the absorptivity of the non-polarization beam splitter 23' is zero. The laser beam incident to non-polarization beam splitter 23' is transmitted, reflected and absorbed at ratios corresponding to the transmittance, reflectance and absorptivity as described above, and a sum of the ratios is 1 (100%). The transmittance of the non-polarization beam splitter 23' is preferably from 90 to 99%. If the transmittance is lower than the range described above, the lowering of the irradiation power can be compensated also by increasing the number of the semiconductor laser light sources 20, the optical systems 30 and the optical fibers 31. It is necessary to consider that the transmittance, the reflectance, the absorptivity of optical components are depend on the wavelength.

The mode field diameter of the optical fiber 31 is preferably from 3 to 7 μm, more preferably from 4 to 6 μm. Shorter length is preferred for the optical fiber 31 in view of light loss or cost for the optical fiber. The power can be increased by increasing the number of the optical fibers 31. Further, for obtaining an identical power, increase for the number of the optical fibers 31 can provide a merit capable of mitigating load on each of the semiconductor laser light source(s) 20.

The number of the optical fibers bundled into the bundling mechanism 32 depends on the used semiconductor laser, power, duty and conditions for texturing, and it is preferably 4 or more. This is because the efficiency is about 30 to 40% in total since the efficiency in the optical system 30 for guiding the laser beam emitted from the semiconductor laser light source 20 to the optical fiber 31 is about 50%, and the efficiency in the bundling optical system 32 for bundling the optical fibers into one coupling optical fiber 33 is about 70%. However, if each of the efficiencies differs, an optimal number of the fibers to be bundled fluctuates depending on the difference. The coupling may be conducted also stepwise.

The mode field diameter of the optical fiber (coupling optical fiber) 33 is preferably from 3 to 7 μm, more preferably from 4 to 6 μm, like that in the optical fiber 31 described previously. Then, the core diameter of the optical fiber 33 is preferably decreased as from 4–6 μm to 2–3 μm toward the output facet of the laser beam and the mode field diameter at the output facet port is reduced.

Other optical conditions than those described above of the semiconductor laser module 2 illustrated in FIG. 3 are identical with those in the semiconductor laser module 2 illustrated in FIG. 2. Then, also in the semiconductor laser module 2 illustrated in FIG. 3, like that in the semiconductor laser module 2 illustrated in FIG. 2, when a plurality of semiconductor laser light sources 20, a plurality of optical systems 30, a plurality of optical fibers 31, the coupling mechanism 32, one coupling optical fiber 33 and the collimator 21 are disposed at positions other than those above the substrate rotating mechanism 1 shown in FIG. 1, for instance, the optical path can be changed by combining a total reflection mirror with the condensing objective lens.

With the foregoing constitution, the semiconductor laser module 2 illustrated in FIG. 3 has the following features. That is, since the semiconductor laser has a relatively low power, no sufficient power to form projections can be obtained depending on the conditions used. As a method of increasing the power of the semiconductor laser beam, there can be mentioned, for example, a means for arranging each of elements as an array or a means for increasing a stripe width. However, since any of such means increases the emitting area of the semiconductor laser chip, the condensing area is enlarged when the laser beam is condensed and irradiated on a hard disk substrate. On the other hand, for increasing the power of the semiconductor laser chip without increasing the emission area, there arises a difficulty that the structure and the composition of the chip per se have to be examined and studied.

On the contrary, in the semiconductor laser module 2 illustrated in FIG. 3, since the optical system is designed such that a laser beam having a high power and a true circular beam is taken out from one coupling optical fiber 33 and, subsequently, the laser beam diameter is restricted, it is improved so as to obtain a sufficient power to form projections under wide working conditions.

That is, when laser beams from a plurality of semiconductor light sources are bundled into an optical fiber, the power of the parallel beam before condensation is increased as compared with a case of using one optical source. Further, the beam profile of the laser beam from the coupling optical fiber is a true circle. As a result, because of the circular profile, the light beam can be condensed efficiently, and accordingly, the power of the condensation spot can be taken out at a higher density as compared with the elliptic beam profile of the laser beam emitted from the semiconductor laser chip typically represented by NFP. Accordingly, laser irradiation at high power and power density is possible by the improvement for the optical system even for a low power semiconductor laser.

Figure 4:
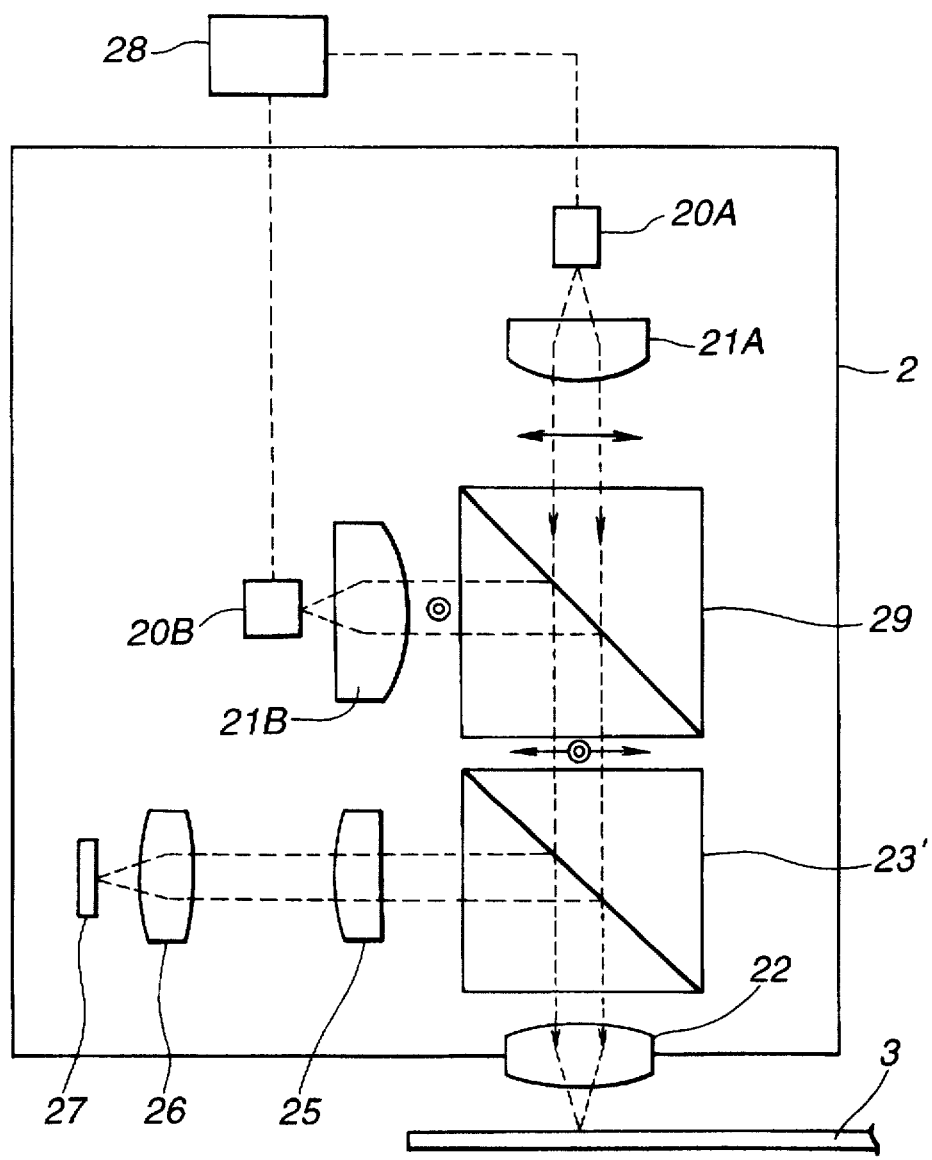

Then, a semiconductor laser module 2 illustrated in FIG. 4 is explained. The semiconductor laser module 2 comprises a means having two different planes of polarization for emitting first and second semiconductor laser beams, a polarization beam multiplextion (polarization beam duplication) means 29 for outputting the first and the second semiconductor laser beams after multiplextion of polarization beam, and a focusing mechanism 22 for irradiating a multiplexed laser beam to a projection-forming surface on a substrate 3 rotationally supported by a substrate rotating mechanism 1. In FIG. 4, symbol "⊙" represents a wave having a plane of polarization perpendicular to the surface of the drawing and reference "⇌" represents a wave having plane of polarization parallel with the surface of the drawing.

In the semiconductor laser module 2 illustrated in FIG. 4, two semiconductor laser light sources 20A, 20B disposed such that planes of polarization are different with each other, are used as the semiconductor laser beam output means. For converting semiconductor laser beams into parallel beams, each of collimators 21A, 21B is disposed between the semiconductor laser light sources 20A, 20B, and polarization beam multiplextion means 29, respectively. Further, the two semiconductor laser light sources 20A, 20B emitting linearly polarized light laser beam are disposed such that the planes of polarization of emitted light are in perpendicular with each other so as to make the power maximum after the multiplextion. Further, as the polarization beam multiplextion means 29, while a polarization beam splitter (PBS) is used, a birefringence crystals may be used. Further, the two semiconductor laser beams having planes of polarization perpendicular with each other can be obtained by arranging the light sources themselves as described above and, alternatively, by utilizing an optical element such as a λ/2 plate that changes the plane of polarization.

In the semiconductor laser module 2 illustrated in FIG. 4, like that of the semiconductor laser module 2 illustrated in FIG. 3, a non-polarization beam splitter (NPBS) 23', a cylindrical lens 25, an objective lens 26 and a 4-segmented photodiode 27 are disposed for constituting a focus error detector (FED) by the detection of a back reflected light.

Other optical conditions than those described above for the semiconductor laser module 2 illustrated in FIG. 4 are identical with those for the semiconductor laser module 2 illustrated in FIG. 2 and FIG. 3. Also, in the semiconductor laser module 2 illustrated in FIG. 4, like that in the semiconductor laser module 2 illustrated in FIG. 2, when the semiconductor laser light sources 20A, 20B, the collimators 21A, 21B, and the polarization beam splitter (PBS) as the polarization beam multiplextion means 29 are disposed at positions other than those above the substrate rotating mechanism 1 shown in FIG. 1, for example, the optical path can be changed by combining an total reflection mirror with the condensing objective lens.

Figure 5:
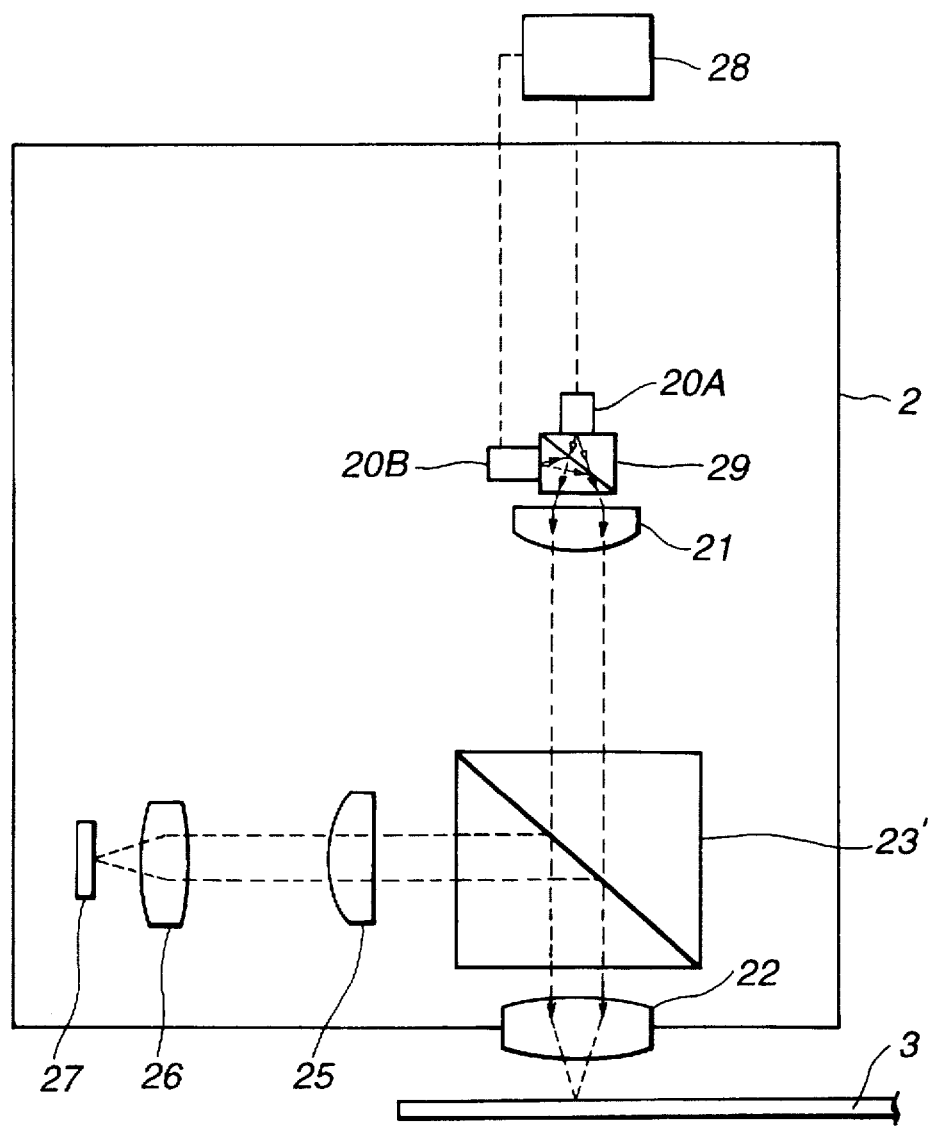

Then, a semiconductor laser module 2 illustrated in FIG. 5 is explained. The constitution of the semiconductor laser module 2 illustrated in FIG. 5 is identical with the semiconductor laser module 2 illustrated in FIG. 4, except that a collimator 21 is disposed after the polarization beam multiplextion means 29 such as the polarization beam splitter, thereby converting the laser light into a parallel beam after the multiplextion of polarization beam. In the semiconductor laser module 2 illustrated in FIG. 5, since the lower limit value for the N.A. of the collimator 21 may be about 0.1 depending on the size of optical components such as PBS or birefringence crystals, it is preferred to select optical components to such size that a collimator 21 having the N.A. from 0.1 to 0.5 can be used.

The semiconductor laser module illustrated in FIG. 4 and FIG. 5 having the constitution described above can irradiate laser beam at high power and power density in the use of the semiconductor laser, like that the semiconductor laser module 2 illustrated in FIG. 3.

By the way, when the semiconductor laser module 2 illustrated in FIG. 4 was investigated for the increasing percentage of power under the conditions at a semiconductor laser light source: 860 nm and the N.A. of collimator 21: 0.3, the results are as follows. That is, power of the laser beam emitted from the two collimators and put to polarization beam multiplextion by PBS (166 mW) was 1.8 times as high as the power of the laser beam emitted from one collimator (90 mW).

Figure 6:
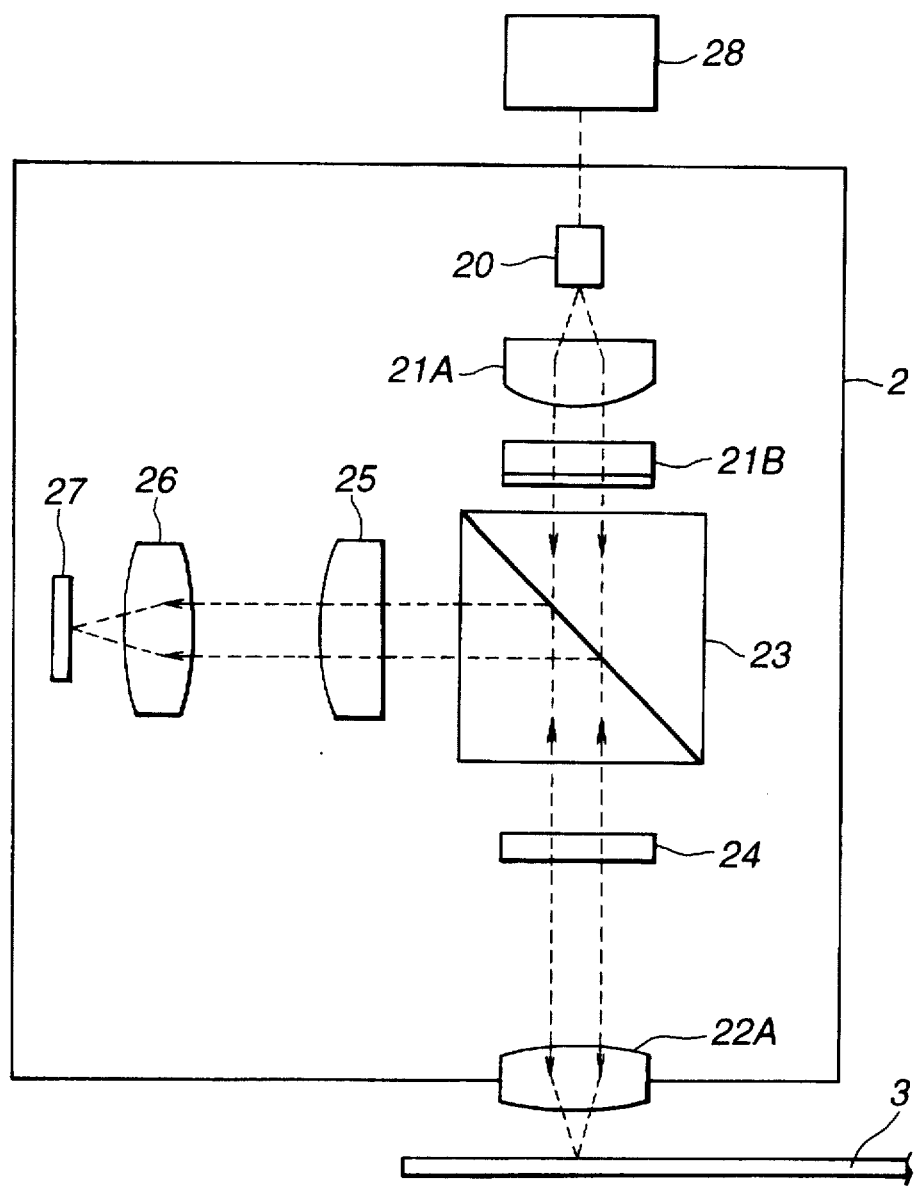

Then, a semiconductor laser module 2 illustrated in FIG. 6 is explained. The semiconductor laser module 2 comprises a semiconductor laser light source 20, a collimator 21A for converting a semiconductor laser light into a parallel beam and a focusing mechanism 22A for irradiating the laser beam to a projection-forming surface on a substrate 3 rotationally supported by a substrate rotating mechanism, and a beam shaping means for adjusting the laser beam profile with respect to an aspect ratio (major axis/minor axis ratio) within a range from 1.0 to 1.5 in a path from the semiconductor laser light source 20 to the substrate 3.

In the semiconductor laser module 2 illustrated in FIG. 6, a cylindrical lens 21B is used as the beam-shaping means. The basic structure of the semiconductor laser module 2 illustrated in FIG. 6 is identical with the semiconductor laser module 2 illustrated in FIG. 2 and it is different from the semiconductor laser module 2 illustrated in FIG. 2 only in that a cylindrical lens 21B is disposed between the collimator 21A of the semiconductor laser module 2 and the polarization beam splitter (PBS) 23. The cylindrical lens 21B may be disposed between the semiconductor laser light source 20 and the collimator 21A.

A focal distance as a parameter of the cylindrical lens 21B is selected to such an optimum value that a parallel beam can be obtained on the basis of the N.A. of the collimator 21A and the distance between the cylindrical lens 21B and the semiconductor laser light source 20. For example, if it is intended to shorten the major axis of the elliptic laser beam, a cylindrical lens 21B of a small focal distance is used.

Further, as the cylindrical lens 21B gets farther to the semiconductor laser chip light source, the major axis of the elliptic laser beam can be shortened more. The axial direction of the cylindrical lens 21B corresponds to a direction in perpendicular to the major axis of the elliptic laser beam (minor axis direction). The cylindrical lens 21B is preferably constituted with a lens having the N.A. of from 0.1 to 0.5.

Other optical conditions than those described above for the semiconductor laser module 2 illustrated in FIG. 6 are identical with those for the semiconductor laser module 2 illustrated in FIG. 2. Then, also in the semiconductor laser module 2 illustrated in FIG. 6, like that the semiconductor laser module 2 illustrated in FIG. 2, when the semiconductor laser light source 20, the collimator 21A and the cylindrical lens 21B are disposed to positions other than those above the substrate rotating mechanism 1 shown in FIG. 1, for example, the optical path can be changed by combining a total reflection mirror with a condensing objective lens 22A.

Figure 7:
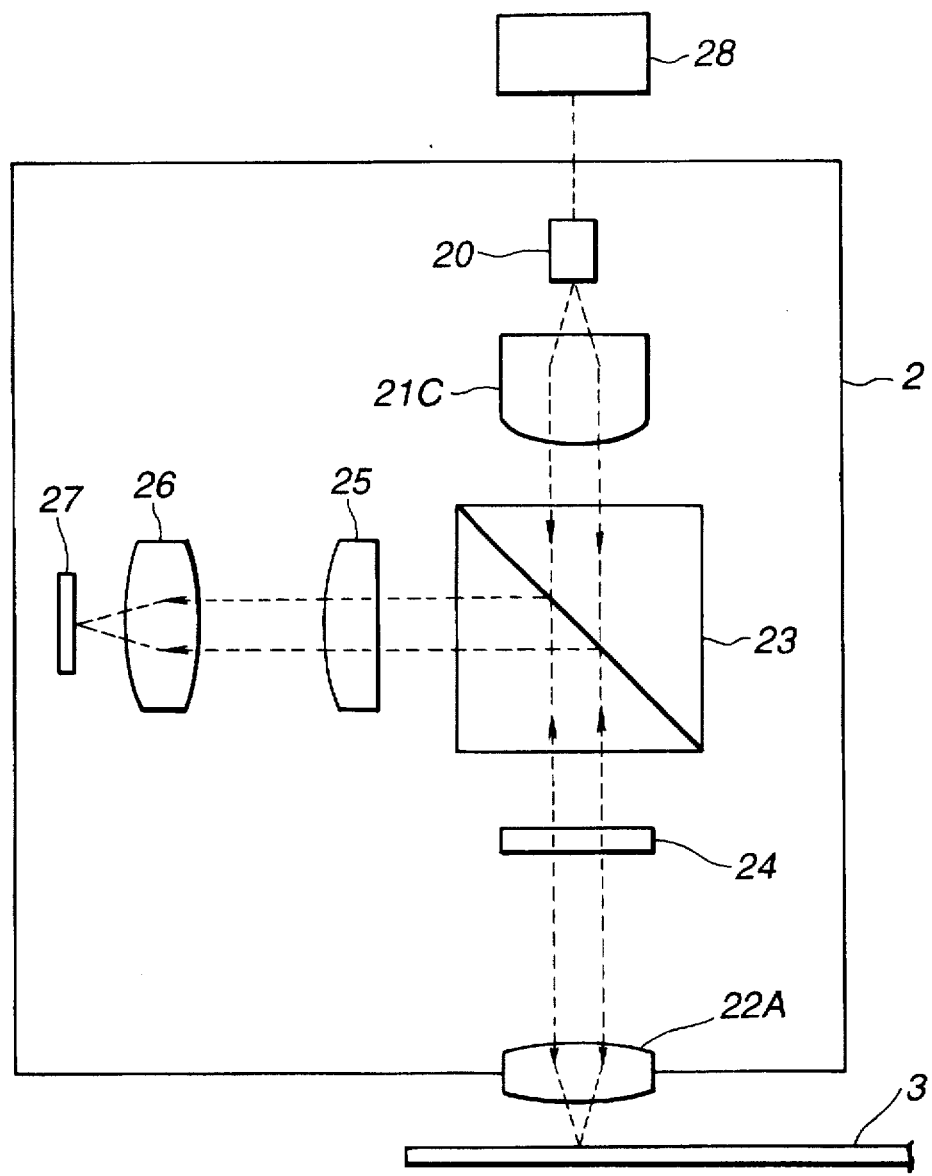
Figure 8:
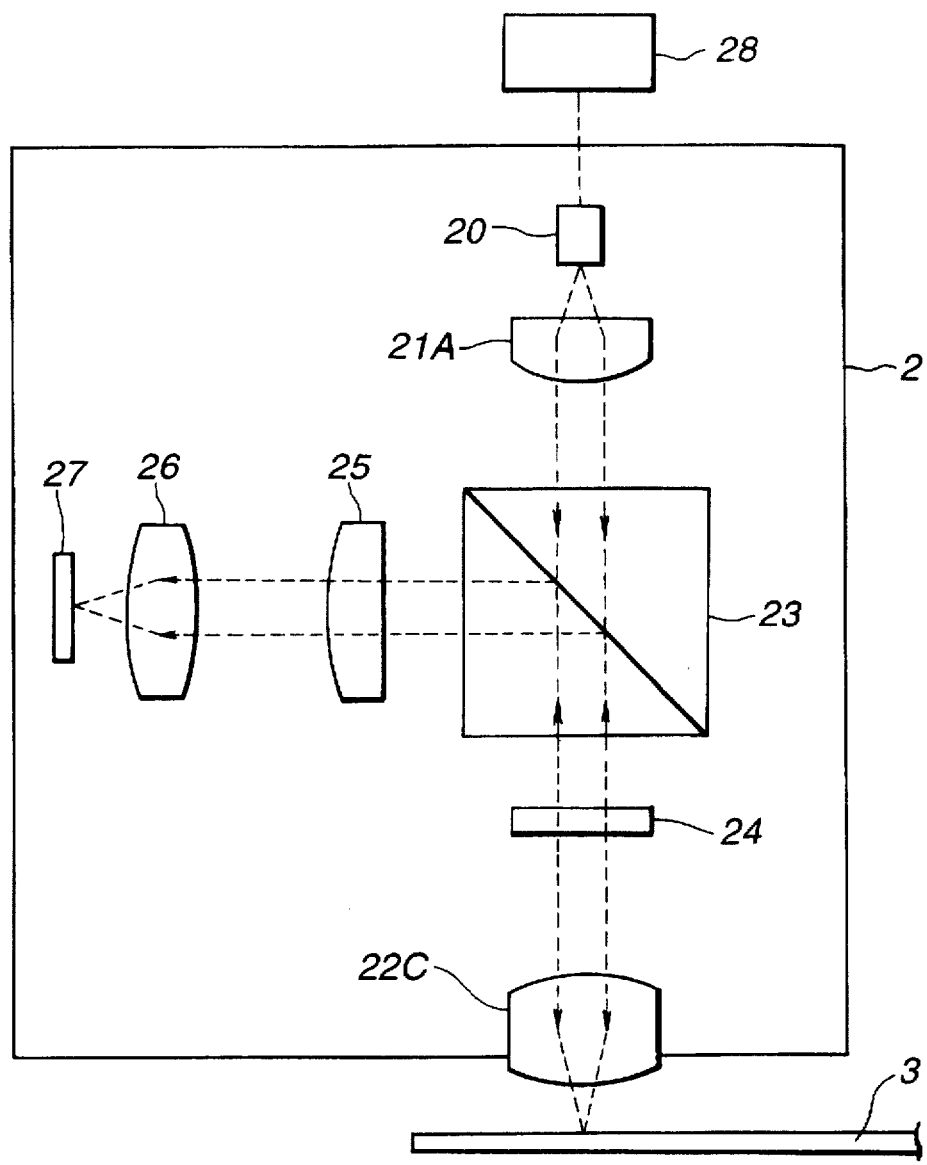

Then, semiconductor laser modules 2 illustrated in FIG. 7 and FIG. 8 are explained.

The structures of the semiconductor laser modules 2 illustrated in FIG. 7 are identical with those of the semiconductor laser module 2 illustrated in FIG. 6, except for the use of an integrated beam shaping lens 21C that has both a function of the collimator 21A and a function of the cylindrical lens 21B as a beam shaping means in the semiconductor laser module 2 illustrated in FIG. 6, instead of the collimator 21A.

The structures of the semiconductor laser modules 2 illustrated in FIG. 8 are identical with those of the semiconductor laser module 2 illustrated in FIG. 6, except for the use of an integrated beam shaping lens 22C having both a function of the cylindrical lens 21B and a function of the focusing objective lens 22A as a beam shaping means in the semiconductor laser module 2 illustrated in FIG. 6.

The semiconductor laser modules 2 illustrated in FIG. 6 and FIG. 7 are advantageous, for example, in that handling is easy since a true circle beam is detected upon conducting autofocusing. Further, the semiconductor laser modules 2 illustrated in FIG. 7 and FIG. 8 can reduce the number of optical components, suffer from less optical loss and are easy for optical control.

The semiconductor laser modules 2 illustrated in FIG. 6 to FIG. 8 can conduct laser irradiation at high power and power density, like that the semiconductor laser module 2 illustrated in FIG. 3, by the constitution having the beam shaping means for adjusting the laser beam profile with respect to the major axis/minor axis ratio within the range from 1.0 to 1.5 (preferably 1.0 to 1.2) in a path from the semiconductor laser light source 20 to the substrate 3. That is, with the constitution described above, the power density is higher than that in the case of the elliptic laser beam.

By the way, when the beam shape of the semiconductor laser module 2 illustrated in FIG. 7 was observed under the conditions at a wavelength of the semiconductor laser light source 20: 860 nm, the N.A. of the beam shaping lens 21C: 0.1 and the N.A. of the objective lens 22A: 0.8, the results are as follows.

That is, the beam spot had a size of 1.53 μm×1.51 μm at a major axis/minor axis ratio of 1.01, which was an around true circular shape.

On the other hand, the result of using only a collimator lens having the N.A. of 0.1 instead of the beam shaping lens 21C was as follows.

That is, the beam spot had a size of 2.59 μm×1.44 μm at a major axis/minor axis ration of 1.80, which was an elliptic shape.

Then, since the ration of the condensation spot is represented by the following formula, the area of the elliptic spot shape is 1.61 times the area of a circular spot shape.

(Area of Elliptic Spot Shape):
(Area of circular spot Shape)=2.59 μm×1.44 μm: 1.53 μm×1.51 μm As apparent from the result, the power density at the condensation spot is increased to 1.61 even under the same light source condition by beam-shaping a semiconductor laser beam profile into a circular shape.

The shape of the projection obtained by texturing is observed by a three dimensional surface structure analyzing microscope (trade name: "ZYGO"). Usually, the height of the projection is about 5 to 100 nm and the width of the projection at a datum plane (for example, the width of the surface cutting the projection at a datum plane (dotted line surface) in FIG. 10 (*b*), hereinafter referred to as "projection width") is about 0.5 to 5 μm. The height of the projection represents the height of a projection with reference to the center line of a roughness curve defined by the surface roughness according to JIS (B0601 1982).

According to the present invention as described above, by using the semiconductor laser as a laser beam source, not only the cost for the entire apparatus is reduced but also the size of the apparatus itself is decreased. Further, since the repeating frequency and the duty can be controlled for a wise range, it is extremely advantageous industrially in that the texturing condition can be controlled finely. Particularly, according to the present invention in which the optical system of the semiconductor laser module is improved, a sufficient power can be obtained for the formation of the projection by the using conditions for a wide range.

EXAMPLES

The present invention is explained more in details by way of the following examples but the invention is not restricted to the examples so long as it does not exceed the scope thereof. Further, in the following examples, apparatuses shown in FIG. 1 and FIG. 2 were used. For the semiconductor laser light source (LD) an AlGaAs laser (wavelength: 850 nm) was used.

Example 1

<Design for Semiconductor Laser Module>

For the constitution of a semiconductor laser module, a semiconductor laser light source (LD) having NFP with a major axis of 4.4 μm and a minor axis of 2.1 μm upon supply of 150 mA current, a collimator lens having the N.A. of 0.5 and a condensing objective lens having the N.A. of 0.55 were used. It was confirmed that the laser beam condensed ahead of the objective lens of the semiconductor laser module had an elliptic spot having a diameter of a major axis of 4.1 μm and a minor axis of 2.2 μm upon supply of 150 mA current. The stripe width of LD is shown in Table 1.

<Texturing>

Figure 10A:
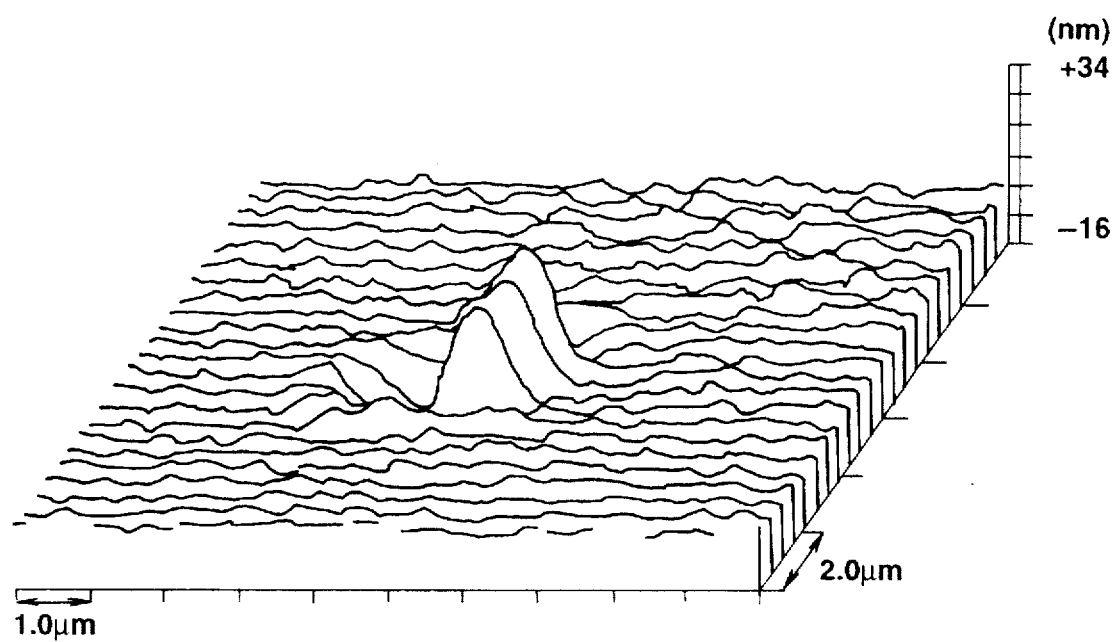
FIG. 10 (a) is a perspective view illustrating the shape of a projection obtained in Example 1 and FIG. 10 (b) is a vertical cross-sectional view of a plane passing through the center of a projection obtained in Example 1 and in parallel with a laser beam scanning direction of the laser beam.
Figure 10B:
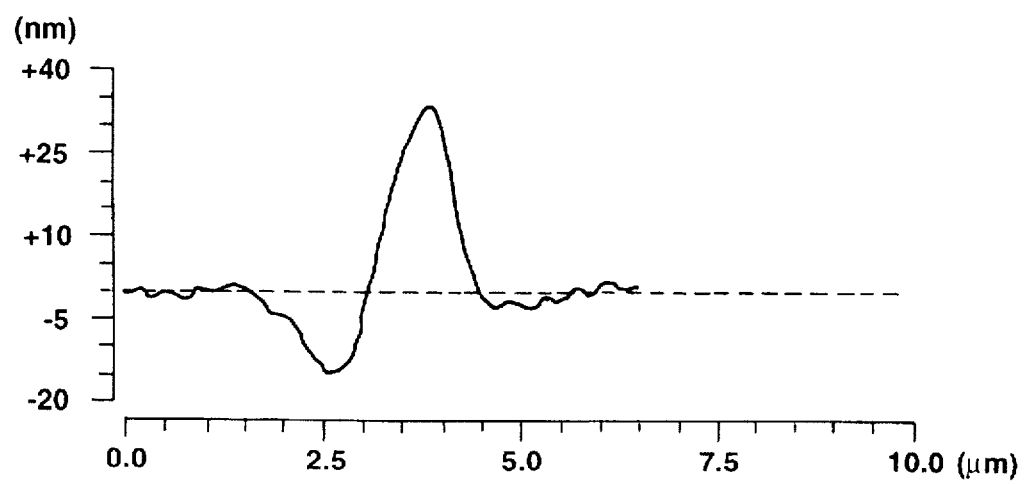

A glass substrate for hard disk applied with Ni-P sputtering to a thickness of 150 nm was used as the substrate. Texturing was applied under irradiation of a laser beam to the surface of the Ni-P layer under the conditions at number of rotation of the substrate: 900 rpm, power at the surface of plate: 220 mW, repeating frequency: 150 kHz and duty: 8% of the semiconductor laser beam. The results are shown in Table 1. FIG. 10 (*a*) and FIG. 10 (*b*) show a result of observation for the surface shape by a three-dimensional surface structure analyzing microscope (trade name "ZYGO"). FIG. 10 (*a*) is a perspective view and FIG. 10 (*b*) is a vertical cross sectional view of a plane passing through the center of the projection and in parallel with the scanning direction of the laser beam (track direction).

Examples 2–8

Texturing was applied in the same manner as in Example 1 except for using a semiconductor laser module optically designed such that the spot diameter of the laser beam condensed ahead of the objective lens was elliptic as shown in Table 1 upon supply of 150 mA current with constituent elements of the semiconductor laser module and changing the working conditions as shown in Table 1.

Examples 9–18

Figure 11A:
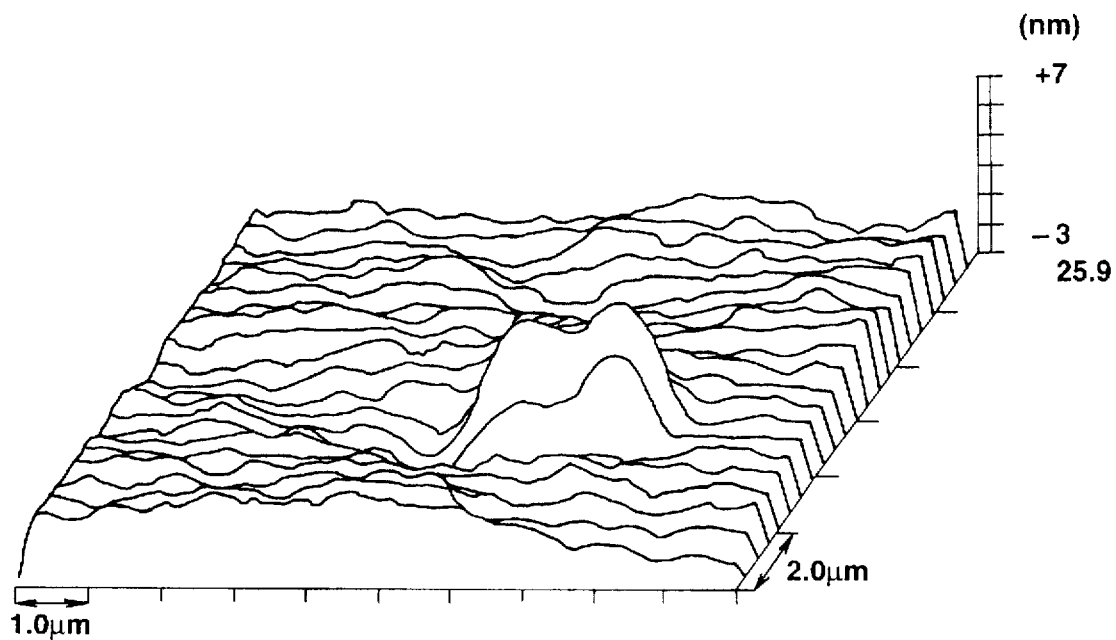
FIG. 11 (a) is a perspective view illustrating the shape of a projection obtained in Example 9 and FIG. 11 (b) is a vertical cross-sectional view of a plane passing through the center of a projection obtained in Example 9 and in parallel with a laser beam scanning direction of the laser beam.
Figure 11B:
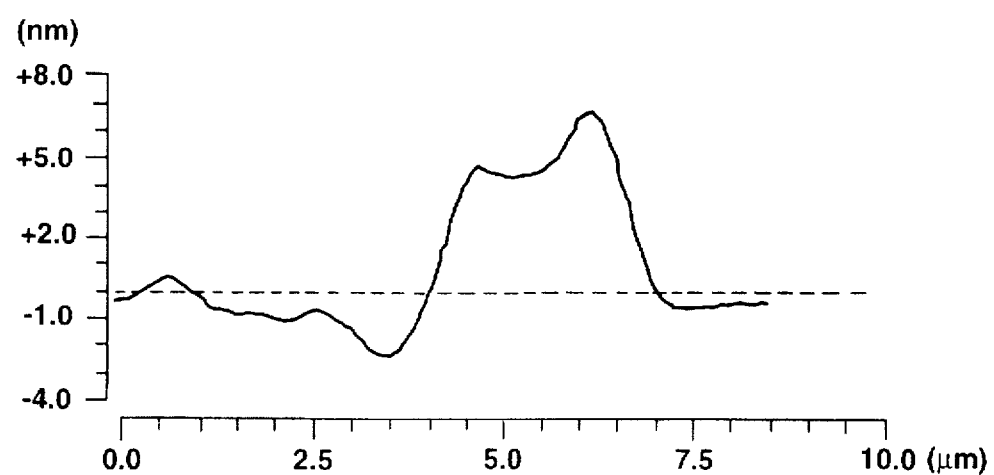
Figure 12A:
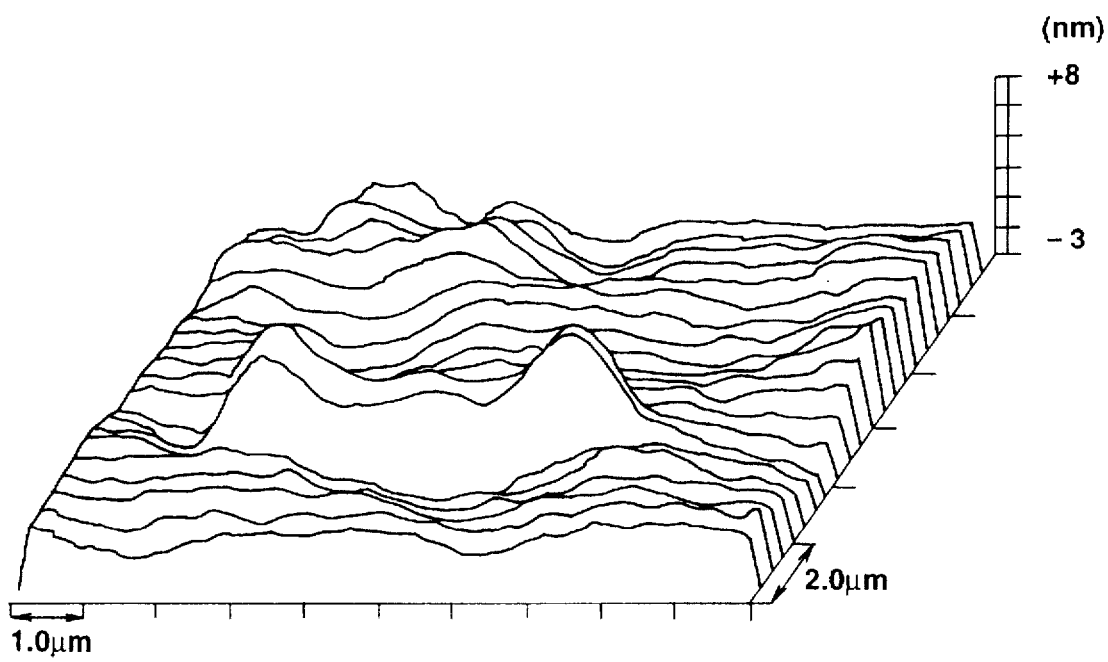
FIG. 12 (a) is a perspective view illustrating the shape of a projection obtained in Example 15 and FIG. 12 (b) is a vertical cross-sectional view of a plane passing through the center of a projection obtained in Example 15 and in parallel with a laser beam scanning direction of the laser beam.
Figure 12B:
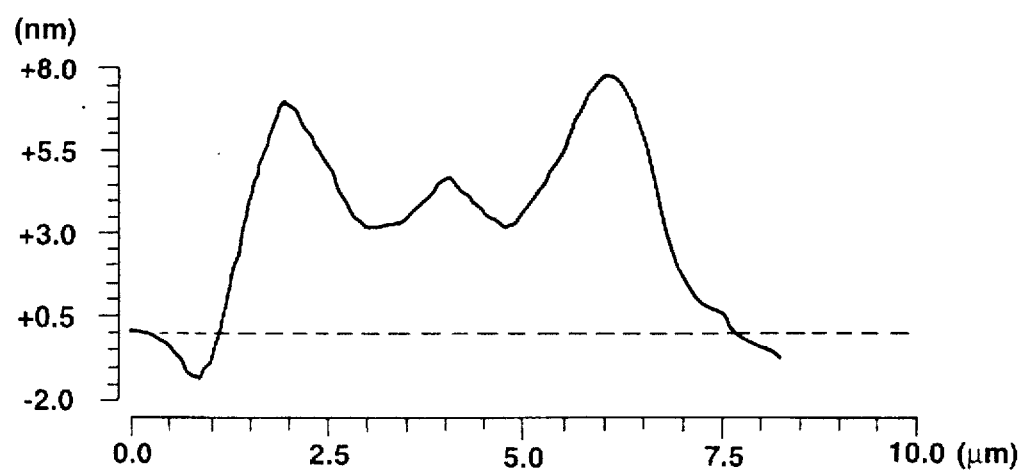
Figure 13A:
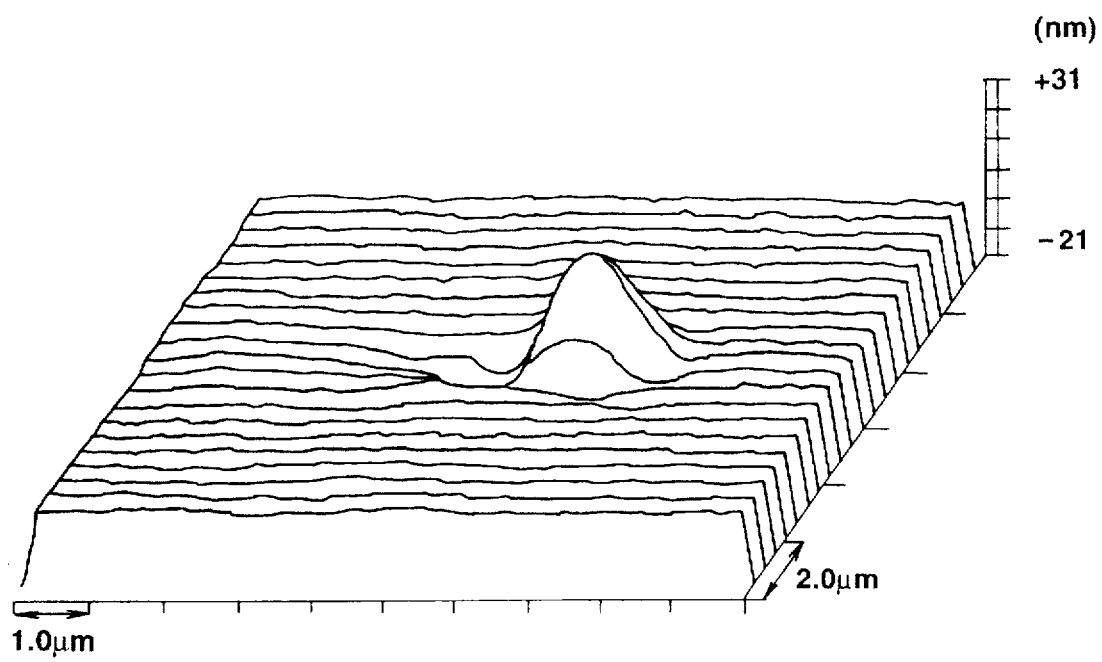
FIG. 13 (a) is a perspective view illustrating the shape of a projection obtained in Example 18 and FIG. 13 (b) is a vertical cross-sectional view of a plane passing through the center of a projection obtained in Example 18 and in parallel with a laser beam scanning direction of the laser beam.
Figure 13B:
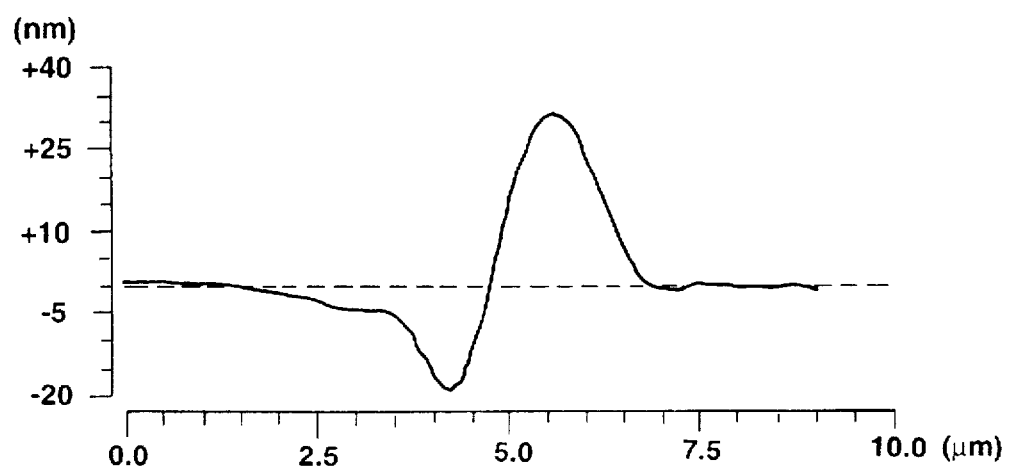

Texturing was applied to a surface of an Ni-P layer of an aluminum substrate for hard disk applied with Ni-P plating to a thickness of 10 μm under the conditions shown in Table 2 and Table 3, by using semiconductor laser modules designed optically as shown in Table 2 and Table 3. Results are shown in Table 2 and Table 3. For examples 9, 15 and 18, the surface shape was observed by a three dimensional structure analyzing microscope ("ZYGO"). The results are shown respectively in FIG. 11 (*a*), FIG. 11(*b*), FIG. 12 (*a*), FIG. 12 (*b*), FIG. 13 (*a*) and FIG. 13 (*b*). In each of the figures, FIG. 11(*a*), FIG. 12 (*a*), and FIG. 13 (*a*) are a perspective view, respectively, and FIG. 11(*b*), FIG. 12 (*b*) and FIG. 13 (*b*) are a vertical cross sectional view of a plane passing through the center of the projection and in parallel with the scanning direction of the laser beam, respectively.

Examples 19 and 20

Figure 14A:
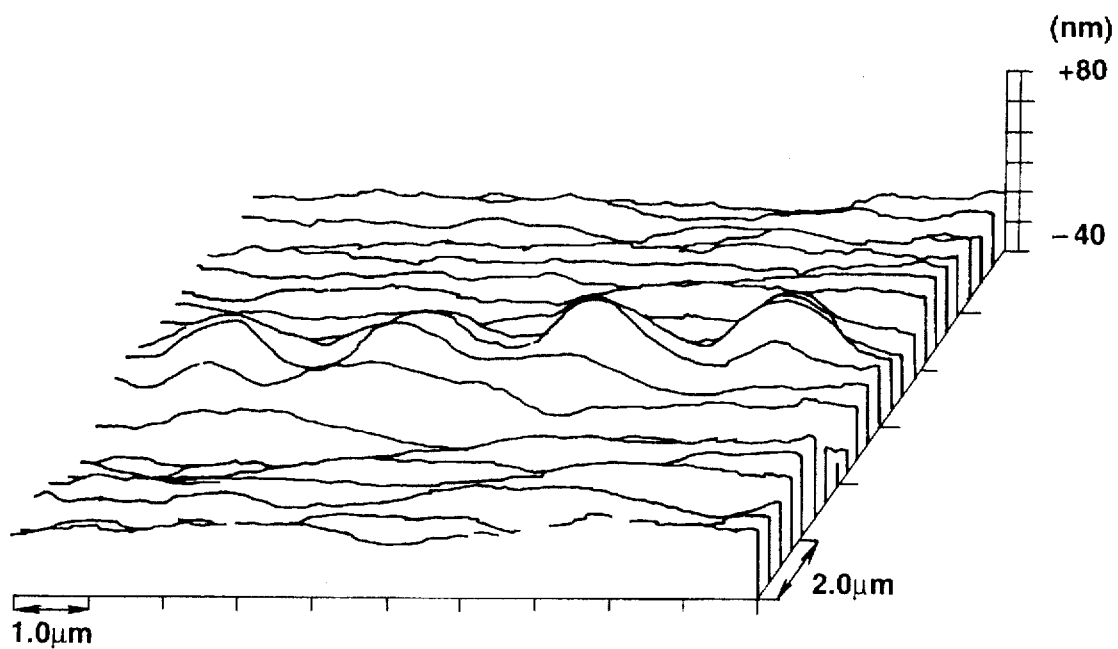
FIG. 14 (a) is a perspective view illustrating the shape of a projection obtained in Example 19 and FIG. 14 (b) is a vertical cross-sectional view of a plane passing through the center of a projection obtained in Example 19 and in parallel with a laser beam scanning direction of the laser beam.
Figure 14B:
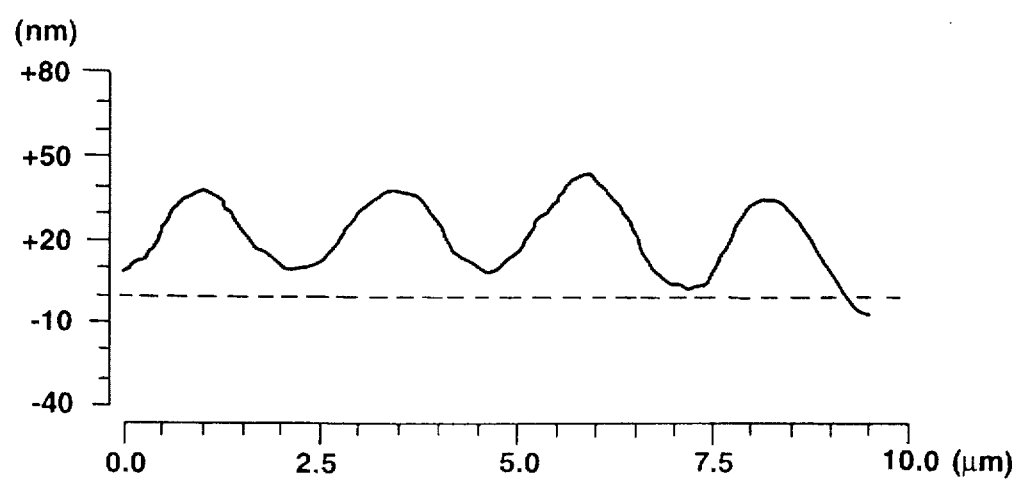

On an Ni-P layer of an aluminum substrate for hard disk applied with Ni-P plating to a thickness of 10 μm, Cr intermediate layer (100 nm), Co magnetic layer (50 nm) and carbon protective layer (15 nm) were formed successively in accordance with a customary manner. Then, texturing was conducted to the surface of the carbon protective layer under the conditions shown in Table 3 by using a semiconductor laser module designed optically as shown in Table 3. The results are shown in Table 3. Further, for Example 19, the surface shape was observed by the three dimensional surface structure analyzing microscope ("ZYGO"). The results are shown in FIG. 14 (*a*) and FIG. 14 (*b*). FIG. 14 (*a*) is a perspective view and FIG. 14 (*b*) is a vertical cross sectional view of a plane passing through the center of the projection and in parallel or orthogonal with the scanning direction of the laser beam.

Examples 21 and 22

Figure 15A:
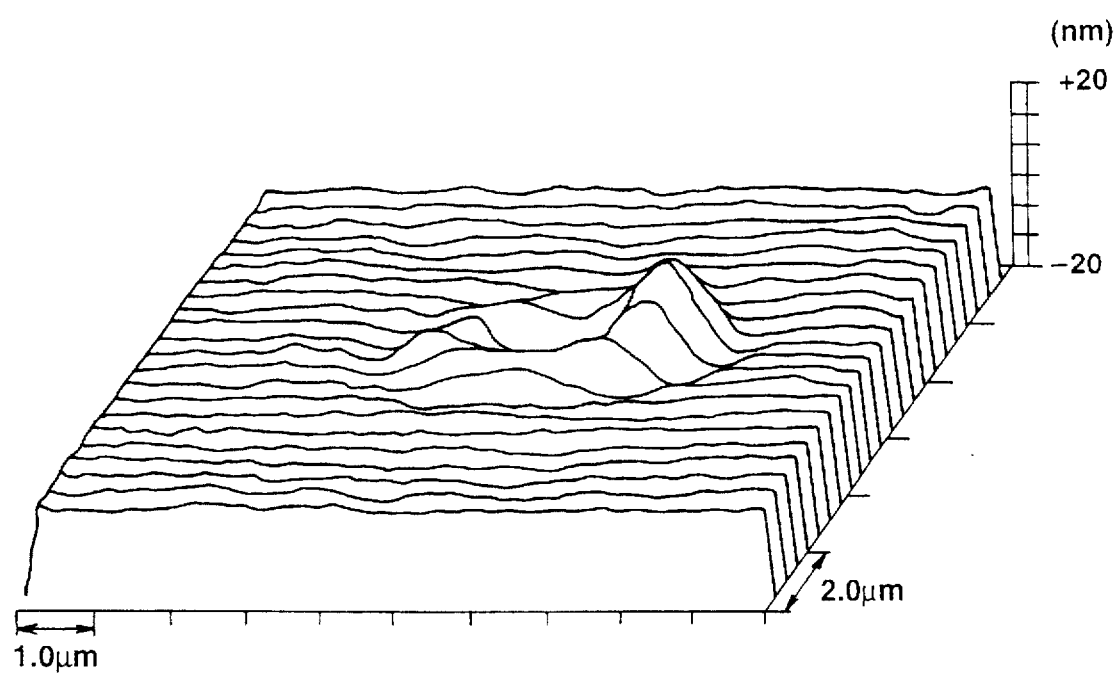
FIG. 15 (a) is a perspective view illustrating the shape of a projection obtained in Example 21 and FIG. 15 (b) is a vertical cross-sectional view of a plane passing through the center of a projection obtained in Example 21 and in parallel or orthogonal with a laser beam scanning direction of the laser beam.
Figure 15B:
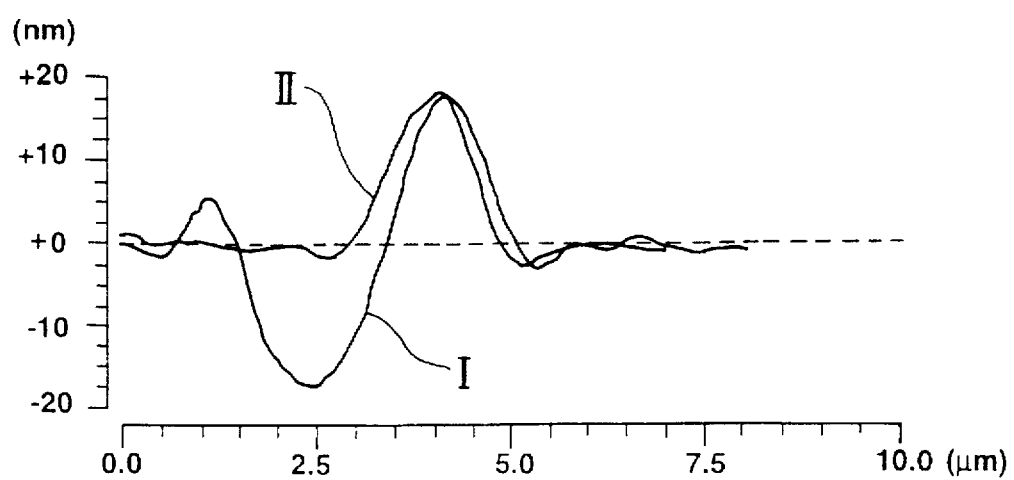
Figure 16A:
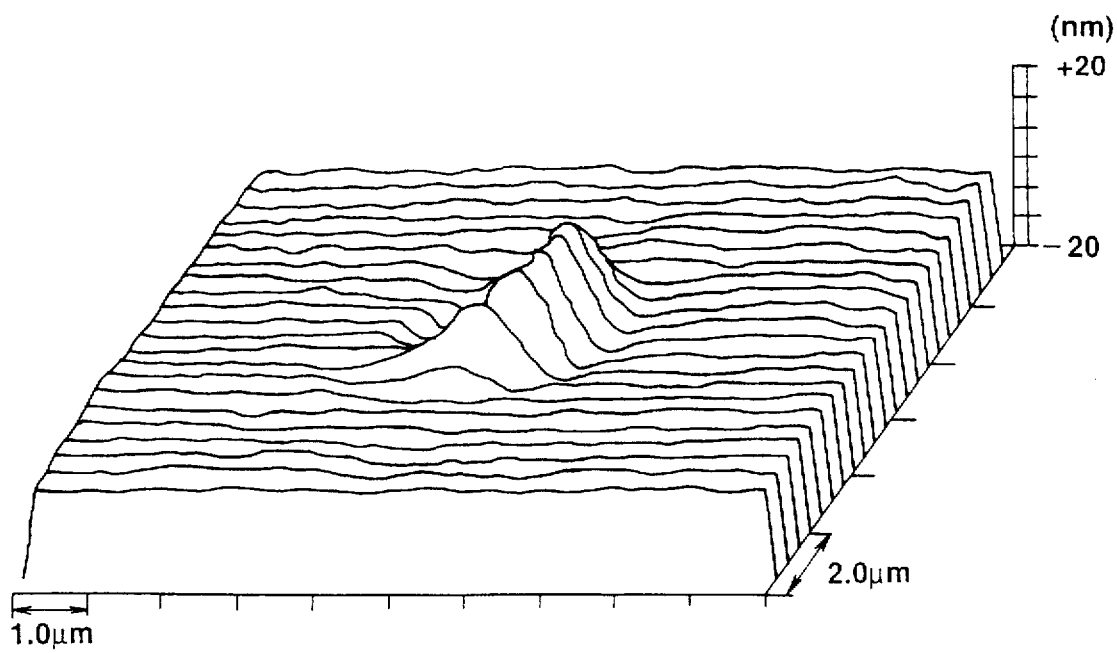
FIG. 16 (a) is a perspective view illustrating the shape of a projection obtained in Example 22 and FIG. 16 (b) is a vertical cross-sectional view of a plane passing through the center of a projection obtained in Example 22 and in parallel or orthogonal with a laser beam scanning direction of the laser beam.
Figure 16B:
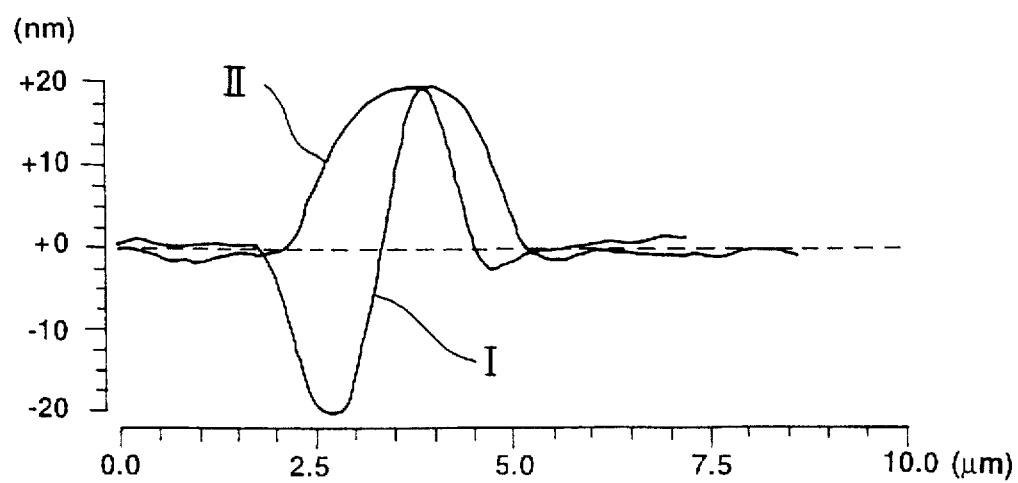

The texturing was applied to the surface of an Ni-P layer of a glass substrate for hard disk applied with Ni-P plating to a thickness of 150 nm under the conditions shown in Table 3 by using a semiconductor laser module designed optically as shown in Table 3. Results of observation for the surface shape by the three dimensional structure analyzing microscope ("ZYGO") are shown in FIG. 15 (*a*) and FIG. 15 (*b*) (Example 21), and FIG. 16 (*a*) and FIG. 16 (*b*) (Example 22). FIG. 15(*a*) and FIG. 16(*a*) are perspective views, respectively, and FIG. 15(*b*) and FIG. 16(*b*) are vertical cross sectional view of a plane passing through the center of the projection and in parallel with the scanning direction of the laser beam, respectively.

Examples 23–31, and Reference Example 1

Texturing was applied to each of the surfaces of the Ni-P layers of an aluminum substrate for hard disk applied with Ni-P plating to a thickness of 10 μm and of a glass substrate for hard disk applied with Ni-P sputtering to a thickness of 150 nm, respectively, by using semiconductor laser modules designed optically as shown in Table 4 and Table 5. The results are shown in Table 4 and Table 5. In the case of Reference Example 1, projections could not be formed on the surface of the Ni-P layer.

TABLE 1

|  | Example 1 | Example 2 | Example 3 | Example 4 |
|---|---|---|---|---|
| LD: NFP major axis (μm) | 4.4 | 4.4 | 4.4 | 4.4 |
| LD: NFP minor axis (μm) | 2.1 | 2.1 | 2.1 | 2.1 |
| LD: Stripe width (μm) | 3.9 | 3.9 | 3.9 | 3.9 |
| LD: current (mA) | 350 | 250 | 300 | 350 |
| Collimator lens N.A. | 0.5 | 0.3 | 0.3 | 0.3 |
| Condensing objective lens N.A. | 0.55 | 0.80 | 0.80 | 0.80 |
| Spot major axis (μm) | 4.1 | 2.9 | 2.9 | 2.9 |
| Spot minor axis (μm) | 2.2 | 1.8 | 1.8 | 1.8 |
| Kind of substrate | GL | GL | GL | GL |
| Surface to be textured | NiP | NiP | NiP | NiP |
| Power at plate surface (mW) | 220 | 130 | 158 | 186 |
| Repeating frequency (kHz) | 150 | 150 | 150 | 150 |
| Duty (%) | 8 | 2 | 2 | 2 |
| Number of rotation of substrate (rpm) | 900 | 900 | 900 | 900 |
| Average projection height (nm) | 34 | 5 | 34 | 63 |
| Average projection width I (μm) | 1.3 | 1.2 | 1.2 | 1.1 |
| Scanning direction | A | A | A | A |

|  | Example 5 | Example 6 | Example 7 | Example 8 |
|---|---|---|---|---|
| LD: NFP major axis (μm) | 4.4 | 4.4 | 4.4 | 4.4 |
| LD: NFP minor axis (μm) | 2.1 | 2.1 | 2.1 | 2.1 |
| LD: Stripe width (μm) | 3.9 | 3.9 | 3.9 | 3.9 |
| LD:current (mA) | 250 | 300 | 350 | 300 |
| Collimator lens N.A. | 0.5 | 0.5 | 0.5 | 0.5 |
| Condensing objective lens N.A. | 0.55 | 0.55 | 0.55 | 0.55 |
| Spot major axis (μm) | 4.1 | 4.1 | 4.1 | 4.1 |
| Spot minor axis (μm) | 2.2 | 2.2 | 2.2 | 2.2 |
| Kind of substrate | GL | GL | GL | GL |
| Surface to be textured | NiP | NiP | NiP | NiP |
| Power at plate surface (mW) | 154 | 187 | 220 | 187 |
| Repeating frequency (kHz) | 150 | 150 | 150 | 150 |
| Duty (%) | 8 | 8 | 8 | 8 |
| Number of rotation of substrate (rpm) | 120 | 120 | 120 | 900 |
| Average projection height (nm) | 6 | 11 | 51 | 8 |
| Average projection width I (μm) | 2.2 | 2.1 | 1.1 | 2.8 |
| Scanning direction | A | A | A | A |

GL: Glass substrate
NiP: Ni—P alloy underlayer
Average projection width I: Average projection width in the scanning direction
Scanning direction A: Direction in parallel with the major axis of the elliptic laser beam

TABLE 2

|  | Example 9 | Example 10 | Example 11 | Example 12 |
|---|---|---|---|---|
| LD: NFP major axis (μm) | 4.4 | 4.4 | 4.4 | 4.4 |
| LD: NFP minor axis (μm) | 2.1 | 2.1 | 2.1 | 2.1 |
| LD: Stripe width (μm) | 3.9 | 3.9 | 3.9 | 3.9 |
| LD: current (mA) | 350 | 300 | 300 | 350 |
| Collimator lens N.A. | 0.5 | 0.3 | 0.3 | 0.3 |
| Condensing objective lens N.A. | 0.55 | 0.80 | 0.80 | 0.80 |
| Spot major axis (μm) | 4.1 | 2.9 | 2.9 | 2.9 |
| Spot minor axis (μm) | 2.2 | 1.8 | 1.8 | 1.8 |
| Kind of substrate | AL | AL | AL | AL |
| Surface to be textured | NiP | NiP | NiP | NiP |
| Power at plate surface (mW) | 220 | 158 | 158 | 186 |
| Repeating frequency (kHz) | 150 | 150 | 150 | 150 |
| Duty (%) | 8 | 2 | 8 | 2 |
| Number of rotation of substrate (rpm) | 900 | 120 | 120 | 120 |
| Average projection height (nm) | 7 | 8 | 10 | 8 |
| Average projection width I (μm) | 3.0 | 1.5 | 1.6 | 1.3 |
| Scanning direction | A | A | A | A |

|  | Example 13 | Example 14 | Example 15 | Example 16 |
|---|---|---|---|---|
| LD: NFP major axis (μm) | 4.4 | 4.4 | 5.9 | 5.8 |
| LD: NFP minor axis (μm) | 2.1 | 2.1 | 1.8 | 2.2 |
| LD: Stripe width (μm) | 3.9 | 3.9 | 6.9 | 5.1 |
| LD: current (mA) | 350 | 350 | 550 | 250 |
| Collimator lens N.A. | 0.3 | 0.5 | 0.3 | 0.3 |
| Condensing objective lens N.A. | 0.80 | 0.55 | 0.55 | 0.80 |
| Spot major axis (μm) | 2.9 | 4.1 | 6.0 | 2.7 |
| Spot minor axis (μm) | 1.8 | 2.2 | 2.1 | 1.5 |
| Kind of substrate | AL | AL | AL | AL |
| Surface to be textured | NiP | NiP | NiP | NiP |
| Power at plate surface (mW) | 186 | 220 | 299 | 144 |
| Repeating frequency (kHz) | 150 | 150 | 150 | 150 |
| Duty (%) | 8 | 8 | 8 | 8 |
| Number of rotation of substrate (rpm) | 120 | 120 | 900 | 900 |
| Average projection height (nm) | 12 | 6 | 8 | 9 |
| Average projection width I (μm) | 2.3 | 2.3 | 6.5 | 1.7 |
| Scanning direction | A | A | A | A |

AL: Aluminum substrate
NiP: Ni—P alloy underlayer
Average projection width I: Average projection width in the scanning direction
Scanning direction A: Direction in parallel with the major axis of the elliptic laser beam

TABLE 3

|  | Ex. 17 | Ex. 18 | Ex. 19 | Ex. 20 | Ex. 21 | Ex. 22 |
|---|---|---|---|---|---|---|
| LD: NFP major axis (μm) | 5.8 | 5.8 | 4.4 | 4.4 | 5.8 | 5.8 |
| LD: NFP minor axis (μm) | 2.2 | 2.2 | 2.1 | 2.1 | 2.1 | 2.1 |
| LD: Stripe width (μm) | 5.1 | 5.1 | 3.9 | 3.9 | 5.1 | 5.1 |
| LD: current (mA) | 350 | 450 | 300 | 350 | 350 | 350 |
| Collimator lens N.A. | 0.3 | 0.3 | 0.3 | 0.3 | 0.3 | 0.3 |
| Condensing objective lens N.A. | 0.80 | 0.80 | 0.80 | 0.80 | 0.80 | 0.80 |
| Spot major axis (μm) | 2.7 | 2.7 | 2.9 | 2.9 | 2.7 | 2.7 |
| Spot minor axis (μm) | 1.5 | 1.5 | 1.8 | 1.8 | 1.5 | 1.5 |
| Kind of substrate | AL | AL | AL | AL | GL | GL |

TABLE 3-continued

|  | Ex. 17 | Ex. 18 | Ex. 19 | Ex. 20 | Ex. 21 | Ex. 22 |
|---|---|---|---|---|---|---|
| Surface to be textured | NiP | NiP | C | C | NiP | NiP |
| Power at plate surface (mW) | 192 | 236 | 158 | 189 | 169 | 169 |
| Repeating frequency (kHz) | 150 | 150 | 150 | 150 | 150 | 150 |
| Duty (%) | 8 | 8 | 8 | 8 | 10 | 10 |
| Number of rotation of substrate (rpm) | 900 | 900 | 120 | 120 | 900 | 900 |
| Average projection height (nm) | 17 | 31 | 45 | 42 | 17 | 21 |
| Average projection width I (μm) | 1.7 | 2.0 | 2.5 | 1.5 | 1.5 | 1.2 |
| Average projection width II (μm) | — | — | — | — | 2.2 | 3.1 |
| Scanning direction | A | A | A | A | A | B |

AL: Aluminum substrate
NiP: Ni—P alloy underlayer
C: carbon protective layer
Average projection width I: Average projection width in the scanning direction (refer to "I" in FIG. 15 (b) and FIG. 16 (b))
Average projection width II: Average projection width in a direction perpendicular to the scanning direction (refer to "II" in FIG. 15 (b) and FIG. 16 (b))
Scanning direction A: Direction in parallel with the major axis of the elliptic laser beam
Scanning direction B: Direction in parallel with the minor axis of the elliptic laser beam

TABLE 4

|  | Ex. 23 | Ex. 24 | Ex. 25 | Ex. 26 | Ex. 27 | Ex. 28 |
|---|---|---|---|---|---|---|
| LD: NFP major axis (μm) | 5.9 | 5.9 | 5.9 | 5.9 | 6.3 | 6.3 |
| LD: NFP minor axis (μm) | 2.4 | 2.4 | 2.4 | 2.4 | 2.2 | 2.2 |
| LD: Stripe width (μm) | 5.1 | 5.1 | 5.1 | 5.1 | 5.1 | 5.1 |
| LD: current (mA) | 300 | 350 | 150 | 200 | 450 | 450 |
| Collimator lens N.A. | 0.3 | 0.3 | 0.3 | 0.3 | 0.3 | 0.3 |
| Condensing objective lens N.A. | 0.80 | 0.55 | 0.80 | 0.55 | 0.80 | 0.80 |
| Spot major axis (μm) | 2.8 | 4.3 | 2.8 | 4.3 | 2.8 | 2.8 |
| Spot minor axis (μm) | 1.6 | 2.1 | 1.6 | 2.1 | 1.6 | 1.6 |
| Kind of substrate | AL | AL | GL | GL | GL | GL |
| Surface to be textured | NiP | NiP | NiP | NiP | NiP | NiP |
| Power at plate surface (mW) | 180 | 215 | 87 | 130 | 264 | 264 |
| Repeating frequency (KHz) | 150 | 150 | 150 | 150 | 150 | 150 |
| Duty (%) | 8 | 8 | 8 | 8 | 8 | 4 |
| Number of rotation of substrate (rpm) | 900 | 900 | 900 | 900 | 900 | 900 |
| Average projection height (nm) | 7 | 5 | 6 | 7 | 44 | 31 |
| Average projection width I (μm) | 2.5 | 4.0 | 1.4 | 4.5 | 4.5 | 3.8 |

TABLE 4-continued

|  | Ex. 23 | Ex. 24 | Ex. 25 | Ex. 26 | Ex. 27 | Ex. 28 |
|---|---|---|---|---|---|---|
| Scanning direction | A | A | A | A | A | A |

AL: Aluminum substrate
GL: Glass substrate
NiP: Ni—P alloy underlayer
Average projection width I: Average projection width in the scanning direction
Scanning direction A: Direction in parallel with the major axis of the elliptic laser beam

TABLE 5

|  | Example 29 | Example 30 | Example 31 | Reference 1 |
|---|---|---|---|---|
| LD: NFP major axis (μm) | 6.3 | 6.3 | 6.3 | 5.9 |
| LD: NFP minor axis (μm) | 2.2 | 2.2 | 2.2 | 2.4 |
| LD: Stripe width (μm) | 5.1 | 5.1 | 5.1 | 5.1 |
| LD: current (mA) | 450 | 450 | 450 | 450 |
| Collimator lens N.A. | 0.3 | 0.3 | 0.3 | 0.3 |
| Condensing objective lens N.A. | 0.80 | 0.80 | 0.80 | 0.30 |
| Spot major axis (μm) | 2.8 | 2.8 | 2.8 | 5.9 |
| Spot minor axis (μm) | 1.6 | 1.6 | 1.6 | 2.4 |
| Kind of substrate | GL | GL | GL | AL |
| Surface to be textured | NiP | NiP | NiP | NiP |
| Power at plate surface (mW) | 264 | 264 | 264 | 271 |
| Repeating frequency (kHz) | 150 | 150 | 150 | 150 |
| Duty (%) | 2 | 1 | 0.5 | 8 |
| Number of rotation of substrate (rpm) | 900 | 900 | 900 | 900 |
| Average projection height (nm) | 18 | 6 | 4 | — |
| Average projection width I (μm) | 3.8 | 3.5 | 2.5 | — |
| Scanning direction | A | A | A | A |

Al: Aluminum substrate
GL: Glass substrate
NiP: Ni—P alloy underlayer
Average projection width I: Average projection width in the scanning direction
Scanning direction A: Direction in parallel with the major axis of the elliptic laser beam

What is claimed is:

1. A method of manufacturing a magnetic recording medium having at least a magnetic layer, optionally by means of an underlayer, on a non-magnetic substrate, and occasionally having a protective layer disposed on the magnetic layer, which comprises irradiating to the surface of the non-magnetic substrate, the underlayer, the magnetic layer, the protective layer or the magnetic recording medium, a laser beam from a semiconductor laser module that moves relatively to the non-magnetic substrate, thereby applying a texturing.

2. A method according to claim 1, wherein a laser beam is irradiated from a semiconductor laser module designed optically such that the power at a surface to be textured is not less than 70 mW, a major axis of a spot diameter of the laser beam is not more than 6 μm and a minor axis of a spot diameter of the laser beam is not more than 3 μm.

3. A method according to claim 1, wherein the laser beam is a pulse laser beam and the irradiation is applied under the condition at a repeating frequency from 10 kHz to 4 MHz and at a duty of 1% to 50%.

4. A method according to claim 1, wherein the irradiation is applied by using a pulse laser beam under the condition that each of a rising time and a falling time as defined below is not more than 40% based on a light emission time determined by a pulse application current, where the rising time is time rising from 10% to 90% in an amplitude of a pulse current observed by using an oscilloscope, and the falling time is time falling from 90% to 10% in an amplitude of a pulse current observed by using an oscilloscope.

5. A method according to claim 1, wherein as the laser beam caused to scan on a projection-forming surface of the substrate, an elliptic laser beam having a major axis/minor axis ratio of a spot diameter of not less than 1.5 is used and the scanning is conducted in a direction parallel with the major axis or the minor axis of the ellipse.

6. A method according to claim 1, wherein the texturing is applied to a CSS zone of the magnetic recording medium.

7. A semiconductor laser texturing apparatus comprising a substrate rotating mechanism, a semiconductor laser module including a semiconductor laser beam source, a collimator for converting a semiconductor laser beam into a parallel beam and a light focusing mechanism for irradiating the laser beam to a projection-forming surface of a substrate supported rotationally by the substrate rotating mechanism, and a relative moving mechanism for the substrate supported rotatably by the substrate rotating mechanism and the semiconductor laser module.

8. A semiconductor laser texturing apparatus according to claim 7, wherein the semiconductor laser light source is designed optically so as to provide a power of not less than 80 mW and have a near field pattern of an ellipse or true circle with a major axis of not more than 8 μm and a minor axis of not more than 4 μm, the collimator comprises a collimator lens having a numerical aperture of from 0.1 to 0.5, and the focusing mechanism comprises an optical system including a condensing objective lens having the numerical aperture of from 0.5 to 0.8.

9. A semiconductor laser texturing apparatus according to claim 7, wherein the semiconductor laser module is designed optically so as to provide a power at a surface to be textured of not less than 70 mW and have a spot diameter with a major axis of not more than 6 μm and a minor axis of not more than 3 μm.

10. A semiconductor laser texturing apparatus according to claim 7, wherein the semiconductor laser module is designed such that each of a rising time and a falling time as defined below is not more than 40% based on a light emission time determined by a pulse application current:

where the rising time is time rising from 10% to 90% in an amplitude of a pulse current observed by using an oscilloscope, and the falling time is time falling from 90% to 10% in an amplitude of a pulse current observed by using an oscilloscope.

11. A semiconductor laser texturing apparatus according to claim 7, further comprising a means for changing the scanning direction of the elliptic laser beam.

12. A semiconductor laser texturing apparatus according to claim 7, wherein the semiconductor laser module comprises a plurality of semiconductor laser light sources, a coupling mechanism for bundling laser lights emitted from each of the light sources by way of each of optical fibers into one optical fiber, a collimator for converting laser lights bundled in one optical fiber into a parallel beam, and a focusing mechanism for irradiating the laser beam to a projection-forming surface on a substrate supported rotationally by the substrate rotating mechanism.

13. A semiconductor laser texturing apparatus according to claim 12, wherein the core diameter at an output facet of the bundled optical fiber on the side of the collimator is made smaller compared with the core diameter at an input facet thereof on the side of the optical coupling mechanism.

14. A semiconductor laser texturing apparatus according to claim 7, wherein the semiconductor laser module comprises means having two different planes of polarization for emitting first and second semiconductor laser light, a polarization beam multiplextion means for outputting the first and the second semiconductor laser beams under multiplextion of polarization beam, and a focusing mechanism for irradiating a multiplexed laser beam to a projection-forming surface on the substrate supported rotationally by the substrate rotating mechanism.

15. A semiconductor laser texturing apparatus according to claim 14, wherein two semiconductor laser light sources disposed are used such that the planes of polarization are different with each other as means for emitting the semiconductor laser beam.

16. A semiconductor laser texturing apparatus according to claim 14, wherein the semiconductor laser module comprises collimators disposed corresponding to the first and the second semiconductor laser beams for obtaining parallel beams from the first and the second semiconductor laser beams, and supplying the parallel beams as the first and the second laser beams to the polarization beam multiplextion means.

17. A semiconductor laser texturing apparatus according to claim 14, wherein the polarization beam multiplextion means is a polarization beam splitter or birefringence crystals.

18. A semiconductor laser texturing apparatus according to claim 7, wherein the semiconductor laser module comprises a semiconductor laser light source, a collimator for converting a semiconductor laser beam into a parallel beam, a focusing mechanism for irradiating a laser beam to a projection-forming surface on the substrate supported rotationally by the substrate rotating mechanism, and a beam shaping means for adjusting a laser beam profile with respect to a major axis/minor axis ratio of from 1.0 to 1.5 in a path from the semiconductor laser light source to the substrate.

19. A semiconductor laser texturing apparatus according to claim 18, wherein the beam-shaping means is disposed ahead or behind the collimator lens.

20. A semiconductor laser texturing apparatus according to claim 18, wherein the beam-shaping means is a cylindrical lens.

21. A semiconductor laser texturing apparatus according to claim 20, wherein the beam-shaping means is an integrated beam shaping lens having both a function of the collimator lens and a function of the cylindrical lens together.

* * * * *